United States Patent [19]
Scott

[11] Patent Number: 5,784,403
[45] Date of Patent: Jul. 21, 1998

[54] SPREAD SPECTRUM CORRELATION USING SAW DEVICE

[75] Inventor: Logan Scott, Breckenridge, Colo.

[73] Assignee: Omnipoint Corporation, Colorado Springs, Colo.

[21] Appl. No.: 383,518

[22] Filed: Feb. 3, 1995

[51] Int. Cl.$^6$ .................................................. H04L 27/28
[52] U.S. Cl. .......................... 375/207; 375/208; 375/343
[58] Field of Search ...................................... 375/208, 200, 375/210, 207, 206, 209, 343; 370/335, 342; 364/728.03, 728.07, 724.11

[56] References Cited

U.S. PATENT DOCUMENTS

| | | | |
|---|---|---|---|
| 3,978,436 | 8/1976 | Casanova et al. | 333/30 R |
| 4,021,898 | 5/1977 | Willis et al. | 29/25.35 |
| 4,100,498 | 7/1978 | Alsup et al. | 328/14 |
| 4,131,484 | 12/1978 | Caruso et al. | 134/1 |
| 4,164,628 | 8/1979 | Ward et al. | 179/15 BA |

(List continued on next page.)

FOREIGN PATENT DOCUMENTS

| | | | |
|---|---|---|---|
| 60-5638 | 1/1985 | Japan | H04J 13/00 |
| 2211053 | 6/1989 | Japan | H04L 9/00 |

OTHER PUBLICATIONS

Dixon, Robert C., *Spread Spectrum Systems*, (J. Wiley & Sons, 2d Ed. 1984).

Ralph Eschenbach, *Applications of Spread Spectrum Radio to Indoor Data Communications*, Proceedings of the IEEE, 1982, pp. 34.5-1.

S. Nanayakkara, *High Speed Receiver Designs Based on Surface Acoustic Wave Devices*, Sixth International Conference On Digital Statellite Communications, Sep. 1983, pp. 16–22.

J.H. Collins & P.M. Grant,The Role of Surface Acoustic Wave Technology in Communication Systems, Ultrasonics, Mar. 1972, vol. 10, No. 2, pp. 59–71.

P.J. Hagon et al., A Programmable Surface Acoustic Wave Matched Filter for Phase–Coded Spread Spectrum Waveforms, IEEE Transactions on Microwave Theory and Techniques, Apr. 1973, vol. 21, No. 4, pp. 303–306.

Roger D. Colvin, *Correlators And Convolvers Used In Spread Spectrum Systems*, National Telecommunications Conference, Conference Record vol. 1 of 4, 1982, pp. 22.4.1–22.4.5.

Manfred G. Unkauf, Surface Wave Devices in Spread Spectrum Systems, Surface Wave Filters (Wiley 1977), pp. 477–509.

(List continued on next page.)

*Primary Examiner*—Wellington Chin
*Assistant Examiner*—William Luther
*Attorney, Agent, or Firm*—Lyon & Lyon LLP

[57] ABSTRACT

A technique is provided using a SAW device for correlating to a plurality of different chip code sequences, such as M different chip code sequences, using fewer than M individual SAW correlators. A received signal is provided to a SAW correlator capable of recognizing a plurality of different chip code sequences. The SAW correlator is pre-programmed so as to recognize each different chip code sequence at a different frequency. The received signal is given a programmably selected frequency offset from the center frequency of the received signal (or a downconverted version thereof) and applied to the SAW correlator. The SAW correlator correlates for the particular chip code sequence at the offset frequency. The output of the SAW correlator is given an opposite frequency offset and filtered with a bandpass filter to generate a correlator output at the designated center frequency. In one embodiment, a comb generator signal is multiplied with the received signal to provide a plurality of signals at offset frequencies. The plurality of offset signals are provided to the SAW correlator which simultaneously correlates for all possible chip code sequences. The output of the SAW is connected to a plurality of bandpass filters, each attuned to one of the offset frequencies generated by the comb generator.

62 Claims, 14 Drawing Sheets

U.S. PATENT DOCUMENTS

| | | | |
|---|---|---|---|
| 4,217,563 | 8/1980 | Vale | 333/150 |
| 4,247,942 | 1/1981 | Hauer | 375/25 |
| 4,280,222 | 7/1981 | Flower et al. | 375/38 |
| 4,301,530 | 11/1981 | Gutleber | 370/18 |
| 4,314,393 | 2/1982 | Wakatsuki et al. | 29/25.35 |
| 4,327,438 | 4/1982 | Baier et al. | 375/1 |
| 4,338,579 | 7/1982 | Rhodes | 332/21 |
| 4,409,593 | 10/1983 | Bose | 340/825.5 |
| 4,418,393 | 11/1983 | Zachiele | 364/724 |
| 4,423,519 | 12/1983 | Bennett et al. | 375/80 |
| 4,435,821 | 3/1984 | Ito et al. | 375/1 |
| 4,445,256 | 5/1984 | Huguenin et al. | 29/25.35 |
| 4,470,138 | 9/1984 | Gutleber | 370/342 |
| 4,479,226 | 10/1984 | Prabhu et al. | 375/1 |
| 4,481,640 | 11/1984 | Chow et al. | 375/1 |
| 4,517,679 | 5/1985 | Clark et al. | 375/37 |
| 4,550,414 | 10/1985 | Guinon et al. | 375/1 |
| 4,561,089 | 12/1985 | Rouse et al. | 370/18 |
| 4,562,370 | 12/1985 | Dach | 310/312 |
| 4,567,588 | 1/1986 | Jerrim | 370/18 |
| 4,583,048 | 4/1986 | Gumacos et al. | 329/122 |
| 4,587,662 | 5/1986 | Langewellpott | 375/1 |
| 4,601,047 | 7/1986 | Horwitz et al. | 375/2.2 |
| 4,641,317 | 2/1987 | Fullerton | 375/1 |
| 4,642,505 | 2/1987 | Arvanitis | 310/312 |
| 4,647,863 | 3/1987 | Skudera et al. | 329/112 |
| 4,649,549 | 3/1987 | Halpern et al. | 380/32 |
| 4,653,069 | 3/1987 | Roeder | 380/31 |
| 4,665,404 | 5/1987 | Christy et al. | 342/463 |
| 4,672,254 | 6/1987 | Dolat et al. | 310/312 R |
| 4,688,210 | 8/1987 | Eizenhöfer et al. | 370/18 |
| 4,691,326 | 9/1987 | Tauchiya | 375/1 |
| 4,701,904 | 10/1987 | Darcie | 370/3 |
| 4,707,839 | 11/1987 | Andren et al. | 375/1 |
| 4,730,340 | 3/1988 | Frazier | 375/1 |
| 4,745,378 | 5/1988 | Niitsuma | 333/196 |
| 4,754,453 | 6/1988 | Eizenhofer | 370/95 |
| 4,759,034 | 7/1988 | Nagazumi | 375/1 |
| 4,774,715 | 9/1988 | Messenger | 375/1 |
| 4,811,357 | 3/1989 | Betts | 375/1 |
| 4,815,106 | 3/1989 | Propp et al. | 375/36 |
| 4,894,842 | 1/1990 | Brockhoven et al. | 375/1 |
| 4,901,307 | 2/1990 | Gilhousen et al. | 370/18 |
| 4,905,221 | 2/1990 | Ichiyoshi | 370/18 |
| 4,908,837 | 3/1990 | Mori et al. | 375/1 |
| 4,965,759 | 10/1990 | Uchida et al. | 364/604 |
| 4,979,186 | 12/1990 | Fullerton | 375/23 |
| 4,984,247 | 1/1991 | Kaufmann et al. | 375/1 |
| 5,016,255 | 5/1991 | Dixon et al. | 375/1 |
| 5,022,047 | 6/1991 | Dixon et al. | 375/1 |
| 5,029,184 | 7/1991 | Andren et al. | 375/1 |
| 5,048,015 | 9/1991 | Zilberfarb | 370/312 |
| 5,063,560 | 11/1991 | Yerbury | 370/18 |
| 5,063,571 | 11/1991 | Vancraeynest | 375/200 |
| 5,066,957 | 11/1991 | Mizuno et al. | 342/352 |
| 5,081,642 | 1/1992 | O'Clock et al. | 375/1 |
| 5,103,459 | 4/1992 | Gilhousen et al. | 375/1 |
| 5,111,535 | 5/1992 | Tokunaga | 455/33.2 |
| 5,146,471 | 9/1992 | Cowart | 375/1 |
| 5,157,686 | 10/1992 | Omura et al. | 375/1 |
| 5,166,952 | 11/1992 | Omura et al. | 375/1 |
| 5,170,412 | 12/1992 | Massey | 375/1 |
| 5,177,767 | 1/1993 | Kato | 375/200 |
| 5,185,610 | 2/1993 | Ward et al. | 342/357 |
| 5,202,903 | 4/1993 | Okanoue | 375/343 |
| 5,210,770 | 5/1993 | Rice | 375/200 |
| 5,216,691 | 6/1993 | Kaufmann | 375/1 |
| 5,224,120 | 6/1993 | Schilling | 375/1 |
| 5,253,268 | 10/1993 | Omura et al. | 375/1 |
| 5,274,665 | 12/1993 | Schilling | 375/1 |
| 5,276,705 | 1/1994 | Higgins et al. | 375/1 |
| 5,293,398 | 3/1994 | Hamao et al. | 375/207 |
| 5,313,457 | 5/1994 | Hostetter et al. | 370/18 |
| 5,341,396 | 8/1994 | Higgins et al. | 375/1 |
| 5,347,284 | 9/1994 | Volpi et al. | 342/356 |
| 5,353,300 | 10/1994 | Lee et al. | 375/1 |
| 5,353,303 | 10/1994 | Walthall | 375/1 |
| 5,355,389 | 10/1994 | O'Clock et al. | 375/200 |
| 5,400,359 | 3/1995 | Hikoso et al. | 375/1 |
| 5,410,568 | 4/1995 | Schilling | 375/205 |
| 5,414,728 | 5/1995 | Zehavi | 375/200 |
| 5,414,796 | 5/1995 | Jacobs et al. | 395/2.3 |
| 5,416,797 | 5/1995 | Gilhousen et al. | 375/705 |
| 5,442,662 | 8/1995 | Fukasawa et al. | 375/205 |
| 5,467,367 | 11/1995 | Izumi et al. | 375/206 |
| 5,469,469 | 11/1995 | Haines | 375/201 |
| 5,471,497 | 11/1995 | Zehavi | 375/200 |
| 5,481,533 | 1/1996 | Honig et al. | 370/18 |
| 5,488,629 | 1/1996 | Takahashi et al. | 375/206 |
| 5,491,726 | 2/1996 | Cheng et al. | 375/343 |
| 5,517,518 | 5/1996 | Morson et al. | 375/200 |

OTHER PUBLICATIONS

Colin K. Campbell, *Applications of Surface Acoustice and Shallow Bulk Acoustic Wave Devices*, Proceedings of the IEEE, Oct. 1989, pp. 1453–1484.

Dixon, Robert C. *Spread Spectrum Systems with Commercial Applications* (J. Wiley & Sons, 3d ed. 1994).

Cohen, Marvin N., "Pulse Compression in Pulsed Doppler Radar Systems," reprinted in Morris, Guy V., *Airbourne Pulsed Doppler Radar*, Chap. 8, pp. 123–155, 1988.

Smith, W. Richard, "SAW Filters For CPSM Spread Spectrum Communication", *IEEE National Telecommunications Conference*, pp. 22.1.1–22.1.6, Nov. 1980.

Rohling, Hermann et al., "Mismatched–Filter Design for Periodical Binary Phased Signals", *IEEE Transactions On Aerospace and Electronic System*, 25(6):890–897, Nov. 1989.

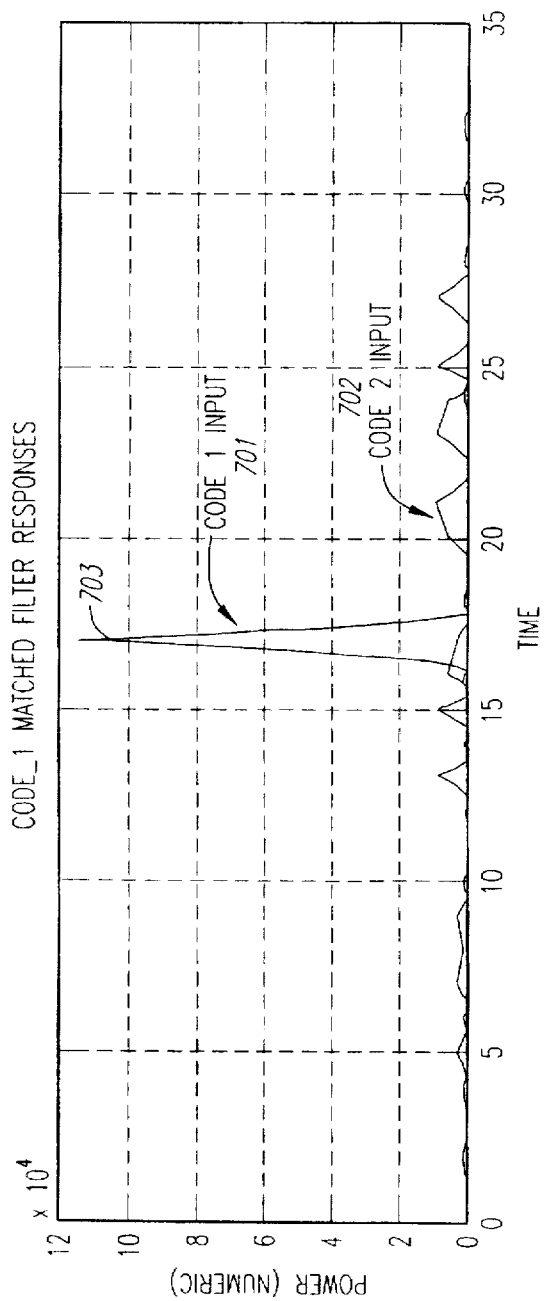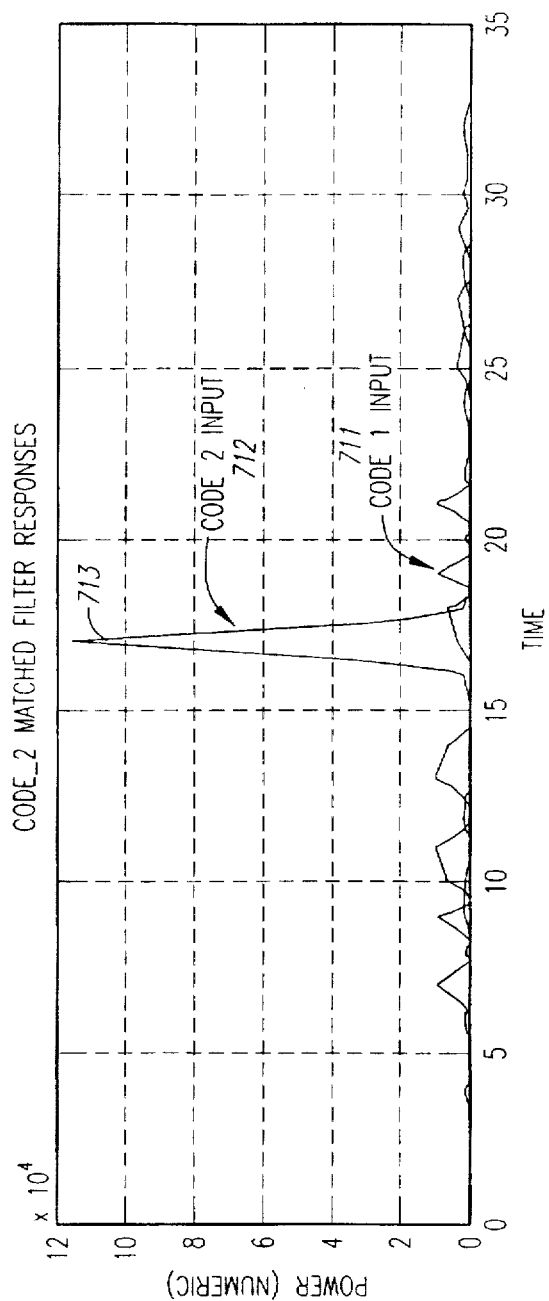

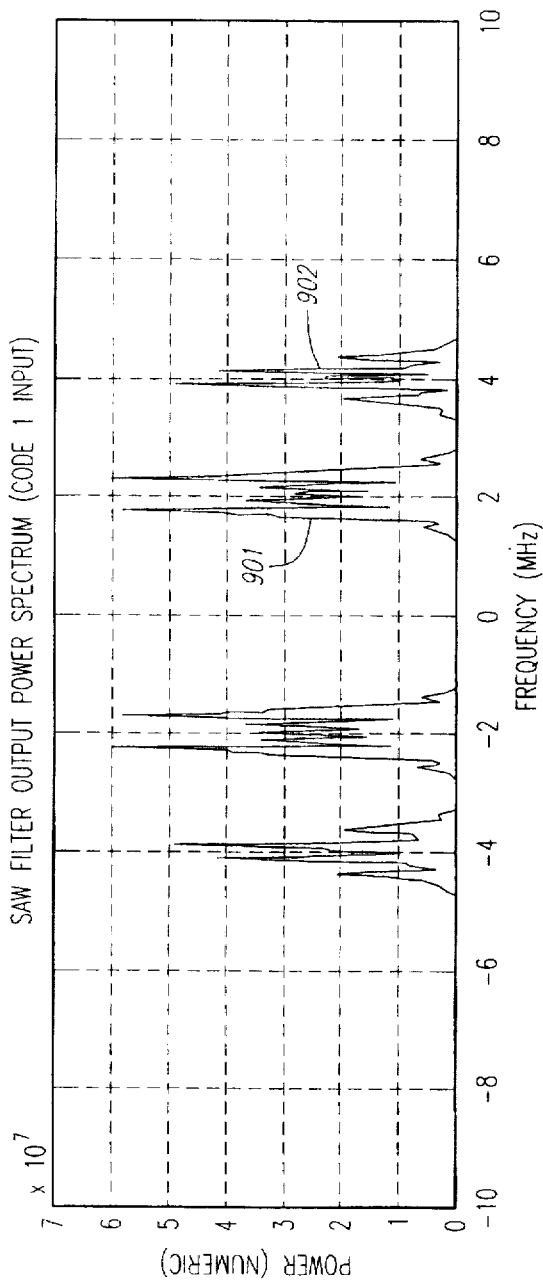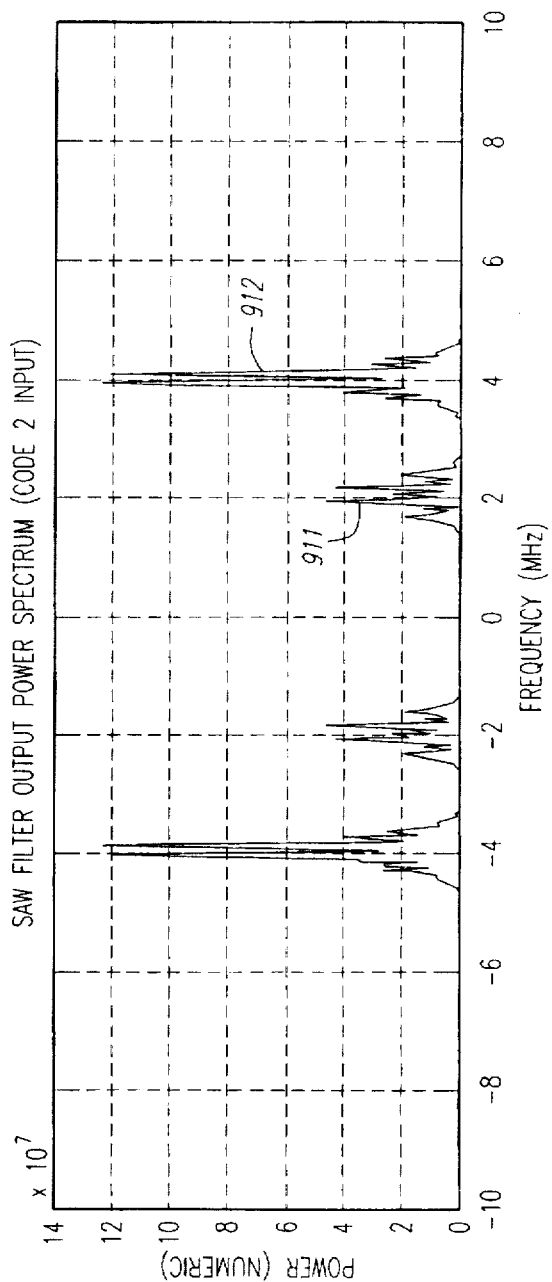

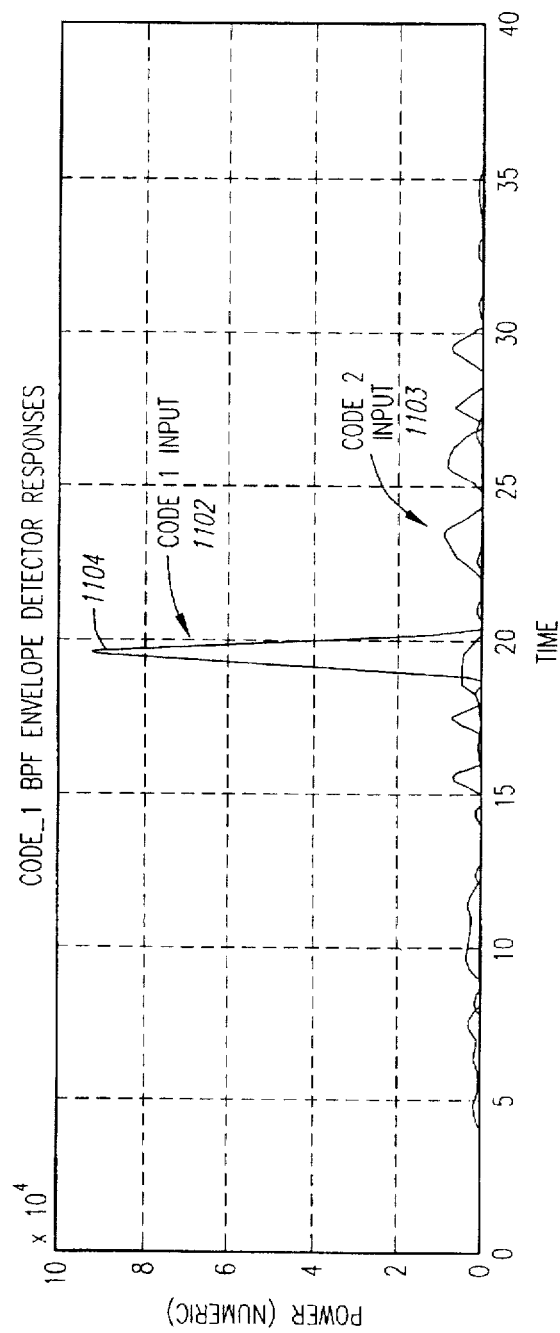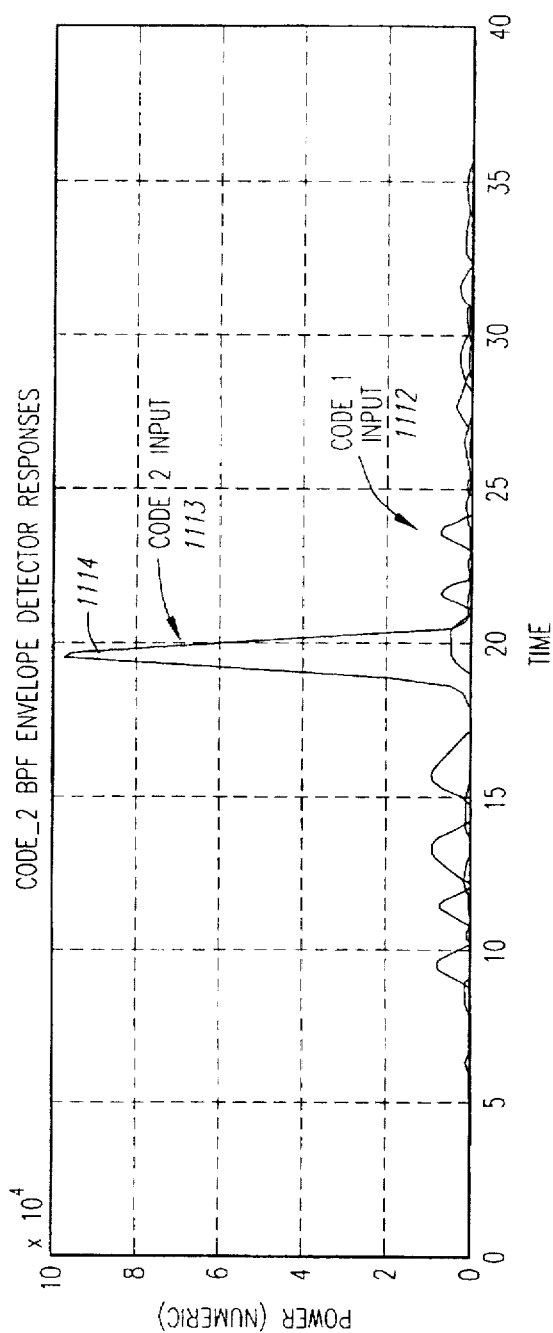

SPREAD SPECTRUM CORRELATION USING SAW DEVICE

FIELD OF THE INVENTION

The field of the present invention pertains to spread spectrum communication and, more particularly, to a method and apparatus for spread spectrum correlation using SAW devices.

DESCRIPTION OF THE RELATED ART

Spread spectrum communication is a technique of communication in which the bandwidth of the transmitted signal generally exceeds the maximum bandwidth required to transmit the information being sent. In direct sequence spread spectrum communication, a data signal is typically modulated with a pseudo-random chip code to generate a transmitted signal spread over a relatively wide bandwidth. The transmitted signal has a low spectral density and appears essentially as noise to those not knowing the chip code. Consequently, spread spectrum communication provides increased security of transmitted information and reduced interference with other sensitive radio equipment being used in the surrounding environment.

Due to the encoded nature of the spread spectrum signal, it is typically necessary for a receiver to despread the spread spectrum signal to recover the original data signal. In one spread spectrum technique, for example, despreading of the spread spectrum signal is accomplished by correlating the received signal with a reference code matching the pseudo-noise code used by the transmitter to transmit the information. After initial correlation is achieved, it is generally necessary to maintain synchronization by tracking the incoming signal so as to keep it aligned with the local reference code.

A number of techniques for spread spectrum correlation are known in the art. For example, a variety of spread spectrum correlators and correlation techniques are described in U.S. Pat. No. 5,016,255 entitled "Asymmetric Spread Spectrum Correlator" issued in the names of Robert C. Dixon and Jeffrey S. Vanderpool, U.S. Pat. No. 5,022,047 entitled "Spread Spectrum Correlator" issued in the names of Robert C. Dixon and Jeffrey S. Vanderpool, U.S. Pat. No. 5,081,642 entitled "Reciprocal SAW Correlator Method and Apparatus" issued in the names of George D. O'Clock, Jr. and Jeffrey S. Vanderpool, and U.S. Pat. No. 5,276,704 entitled "SAWC Phase Detection Method and Apparatus" issued in the name of Robert C. Dixon, each of which is assigned to the assignee of the present invention and hereby incorporated by reference as if fully set forth herein.

Some conventional correlators make use of surface-acoustical-wave devices, or SAW devices, to achieve correlation with a received spread spectrum signal. A SAW device is a thin film planar device that allows propagation of acoustical waves in the region immediately below its free surface. Electrical signals are converted into acoustical signals and back again by use of transducers comprised of piezo-electric material. Further details regarding SAW devices may be found in S. Nanayakkara and J. B. Anderson, "High Speed Receiver Designs Based on Surface Acoustic Wave Devices," printed in Sixth International Conference on Digital Satellite Communications, IEEE Catalog Number 83CH1848-1 (1984).

SAW devices are generally capable of performing over a relatively wide bandwidth, making their use desirable in a variety of applications including spread spectrum correlators. As applied to spread spectrum communication, a SAW correlator is a passive device designed to recognize a specific sequence of code chips, as does a digital correlator. The SAW correlator operates through a correlation of phase shifts in an RF signal.

A SAW correlator is similar in a number of respects to a delay line matched filter, and generally comprises a plurality of delay elements. In one type of SAW correlator, each delay element within the correlator has a delay period equal to the period of the transmitted code clock such that, at a given instant, each element corresponds to one chip of the received signal. As the received encoded signal propagates down the SAW device, the phase structure of each element is added in or out of phase with the propagated wave. The outputs of all the elements may be summed to arrive at a total correlation value. When the phase shift structure of all the elements matches the phase shifts of the propagated wave, then a maximum sum and, hence, a maximum correlation level, is achieved.

SAW devices are of a fixed nature, and thus a SAW correlator is usually programmed in a fixed manner at the time of construction so as to match a single predetermined chip code. The phase shift structure of the SAW device is programmed at the time of construction through transducers placed in each element to produce an elemental phase match, and cannot be changed by the user, thus allowing correlation with only one code sequence. The fixed nature of SAW devices therefore results in a lack of flexibility which can be a drawback where it is desired to recognize a number of different chip codes in a correlator.

In order to allow recognition of different chip codes, a plurality of SAW devices may be used in parallel, each device programmed to respond to a different spread spectrum code. One such technique is described in the Nanayakkara and Anderson article cited above. A drawback of such a technique, however, is that SAW devices are relatively expensive, making the use of multiple SAW devices quite costly. Furthermore, SAW devices can be relatively large and may, for example, be as much as twelve inches long in size, depending on the length of the code sequence to be recognized. The use of multiple parallel SAW devices in a correlator may therefore not be practical in some applications, such as in mobile handsets commonly used in cellular communications.

To be able to recognize multiple spread spectrum codes without necessarily using multiple SAW devices, programmable SAW correlators have been developed which use only a single SAW device to match more than one input waveform. In one programmable device, for example, switched diodes are positioned across each element of the SAW device and are switched on or off depending on the desired code to be read. A programmable SAW device is described in R. Colvin, "Correlators and Convolvers Used in Spread Spectrum Systems," printed in Vol. 1, IEEE Global Communications Conference, Nov. 30–Dec. 4, 1982, pp. 22.4.1 to 22.4.5. A drawback of programmable SAW correlators, however, is that extra hardware, including control circuitry and logic which can become fairly complex, may be required to perform switching functions. Furthermore, programmable SAW devices are ordinarily capable of recognizing only one chip code at a given time.

It would therefore be advantageous to have a receiver using a SAW device capable of correlating to a plurality of different chip code sequences. It would further be advantageous to provide such a receiver also capable of correlating to a plurality of different chip codes simultaneously, and capable of determining which of a plurality of chip codes has been received, without using a different SAW device for each possible chip code, and without requiring complicated switches and associated control logic.

SUMMARY OF THE INVENTION

The invention in one aspect provides a technique for correlating to a plurality of different chip code sequences, such as M different chip code sequences, using fewer than M individual correlators. In one embodiment, a received signal is provided to a single SAW device capable of recognizing a plurality of different chip code sequences. The SAW correlator is pre-programmed so as to recognize each different chip code sequence at a different frequency. The received signal has a carrier of a designated center frequency, or is downconverted to an intermediate signal at a designated center frequency. The received signal, or intermediate signal, is given a programmably selected frequency offset and applied to the SAW correlator, which correlates for the particular chip code sequence at the offset frequency. The output of the SAW correlator is given an opposite frequency offset and filtered with a bandpass filter to generate a correlator output at the designated center frequency.

In a second embodiment, a SAW device is likewise pre-programmed to recognize each different chip code sequence at a different frequency. Instead of providing a single frequency offset to the received signal (or the intermediate signal, as the case may be), a comb generator signal is multiplied with the received signal (or intermediate signal) to provide a plurality of signals at offset frequencies. The plurality of offset signals are provided to the SAW device which simultaneously correlates for all possible chip code sequences. The output of the SAW is connected to a plurality of bandpass filters, each attuned to one of the offset frequencies generated by the comb generator. The output of each bandpass filter is envelope-detected and windowed to ensure data integrity, and provided to comparison and decision means for determining which of the plurality of spread spectrum codes has been received.

BRIEF DESCRIPTION OF THE DRAWINGS

The various objects, features and advantages of the present invention may be better understood by examining the Detailed Description of the Preferred Embodiments found below, together with the appended figures, wherein:

FIG. 7A is a graph showing an expected response of a filter matched to the codeword of FIG. 6A based on two different inputs (the codewords of FIGS. 6A and 6B), and FIG. 7B is a graph showing an expected response of a filter matched to the codeword of FIG. 6B based on the same two inputs of FIG. 7A.

FIGS. 9A and 9B are graphs of output power spectra of the multi-programmed SAW device of FIGS. 8A–8B for an input of the codeword of FIG. 6A and the input of the codeword of FIG. 6B, respectively.

FIG. 11A is a graph showing envelope detected output waveforms of the bandpass filter of FIG. 10A for two different inputs (the codewords of FIGS. 6A and 6B), and FIG. 11B is a graph showing envelope detected output waveforms of the bandpass filter of FIG. 10B for the same two inputs.

DETAILED DESCRIPTION OF THE PREFERRED EMBODIMENTS

Figure 1:
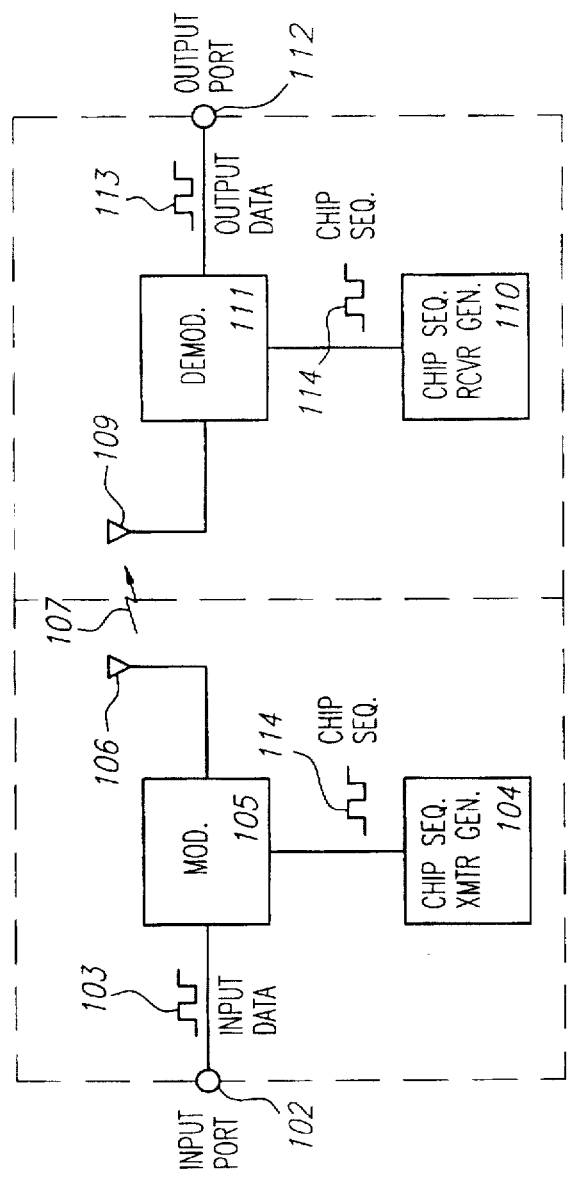
FIG. 1 is a block diagram of a spread spectrum transmitter and receiver as known in the art.

FIG. 1 is a block diagram of a spread-spectrum communication transmitter and receiver as known in the art.

In FIG. 1, a spread-spectrum transmitter 101 comprises an input port 102 for input data 103, a chip sequence transmitter generator 104, a modulator 105, and a transmitting antenna 106 for transmitting a spread-spectrum signal 107. A spread-spectrum receiver 108 comprises a receiver antenna 109, a chip sequence receiver generator 110, a demodulator 111, and an output port 112 for output data 113. In operation, a single chip sequence 114 is identically generated by both the transmitter generator 104 and the receiver generator 110, and appears essentially random to others not knowing the spreading code upon which it is based. An extensive discussion of spread-spectrum communication, spreading codes, and chip sequences, may be found in R. Dixon, *Spread Spectrum Systems with Commercial Applications* (Wiley & Sons, 3d ed. 1994).

Figure 2A:
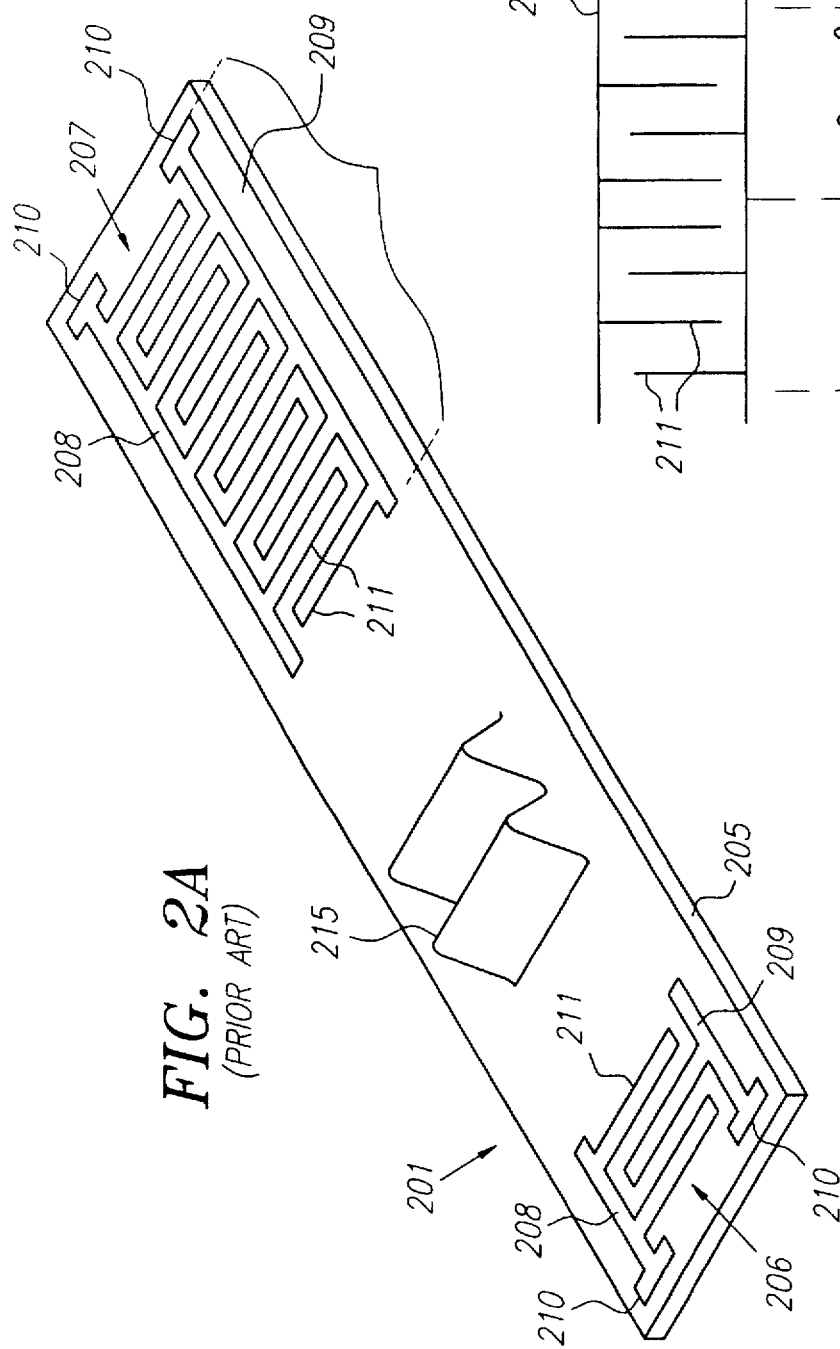
FIG. 2 is a diagram of a SAW device.
Figure 2B:
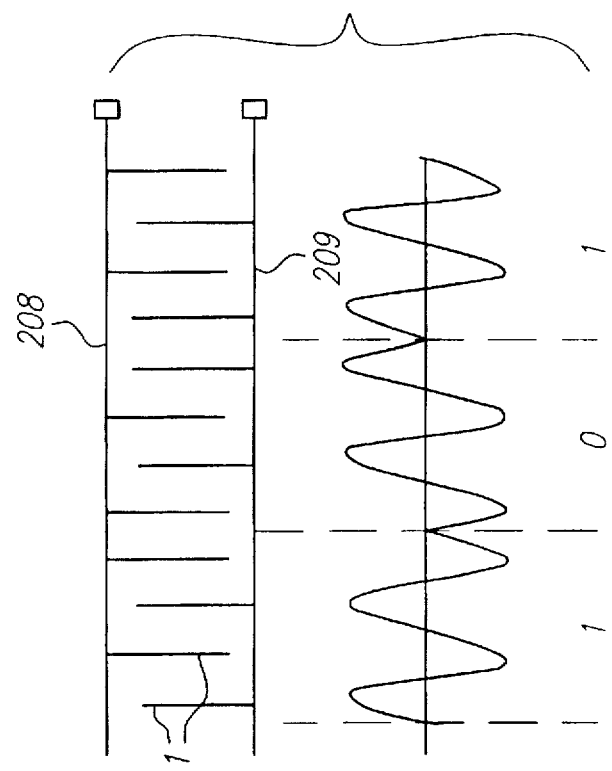

FIG. 2 is a diagram of a SAW device 201. The SAW device 201 comprises a substrate 205 and a pair of transducers 206, 207 located at each end of the substrate 205. The transducers 206, 207 each comprise an upper pad 208 and a lower pad 209 extending lengthwise along the substrate 205. The upper pad 208 and lower pad 209 are terminated by a pair of electrodes 210. The transducers 206, 207 further comprise a plurality of fingers 211, each of which is connected to either the upper pad 208 or the lower pad 209.

The size, spacing and pattern of the fingers 211 determines the response of the SAW device 201 to an input waveform. The application of an input waveform to the pads 208, 209 of the first transducer 206 generates electric fields between the electrodes 210. These electric fields in turn generate periodic stresses in the substrate 205 by means of piezo-electric coupling. The stresses add in phase and increase in amplitude as the waveform passes through the first transducer 206, causing the generation of a surface wave 215 which is free to propagate along the substrate 205.

The second or receiving transducer 208 operates in the opposite fashion. The incoming surface wave 215 induces electric fields between the electrodes 210 by means of piezo-electric coupling. These electric fields are integrated at the upper pad 208 and lower pad 209 of the second transducer 207 to produce a time varying voltage.

The finger pattern is generally related to the shape of the time domain envelope of the input signal to which the SAW device 201 is matched. The spacing of the fingers 211 along the length of the substrate 205 is matched to the frequency of a desired waveform at a particular instant in the time domain. The wider the spacing of the fingers 211, the lower the frequency of the matched waveform. The length of each of the fingers 211 is matched to the amplitude of the desired waveform at the particular instant time. The fingers 211 normally alternate between the upper pad 208 and the lower pad 209 so long as the desired waveform maintains the same phase; thus, consecutive fingers 211 along the same pad 208 or 209 indicate a change in phase or phase reversal. The closer that an input waveform matches the finger pattern, the greater the amplitude of the voltage measured at the pads 208, 209 when the input waveform is received. The fingers 211 are therefore placed in such a manner so as to respond to a particular waveform, and the SAW device 201 will generate a maximum voltage at the instant in time when the received waveform propagating along the SAW device 201 most closely matches the finger pattern.

Figure 3:
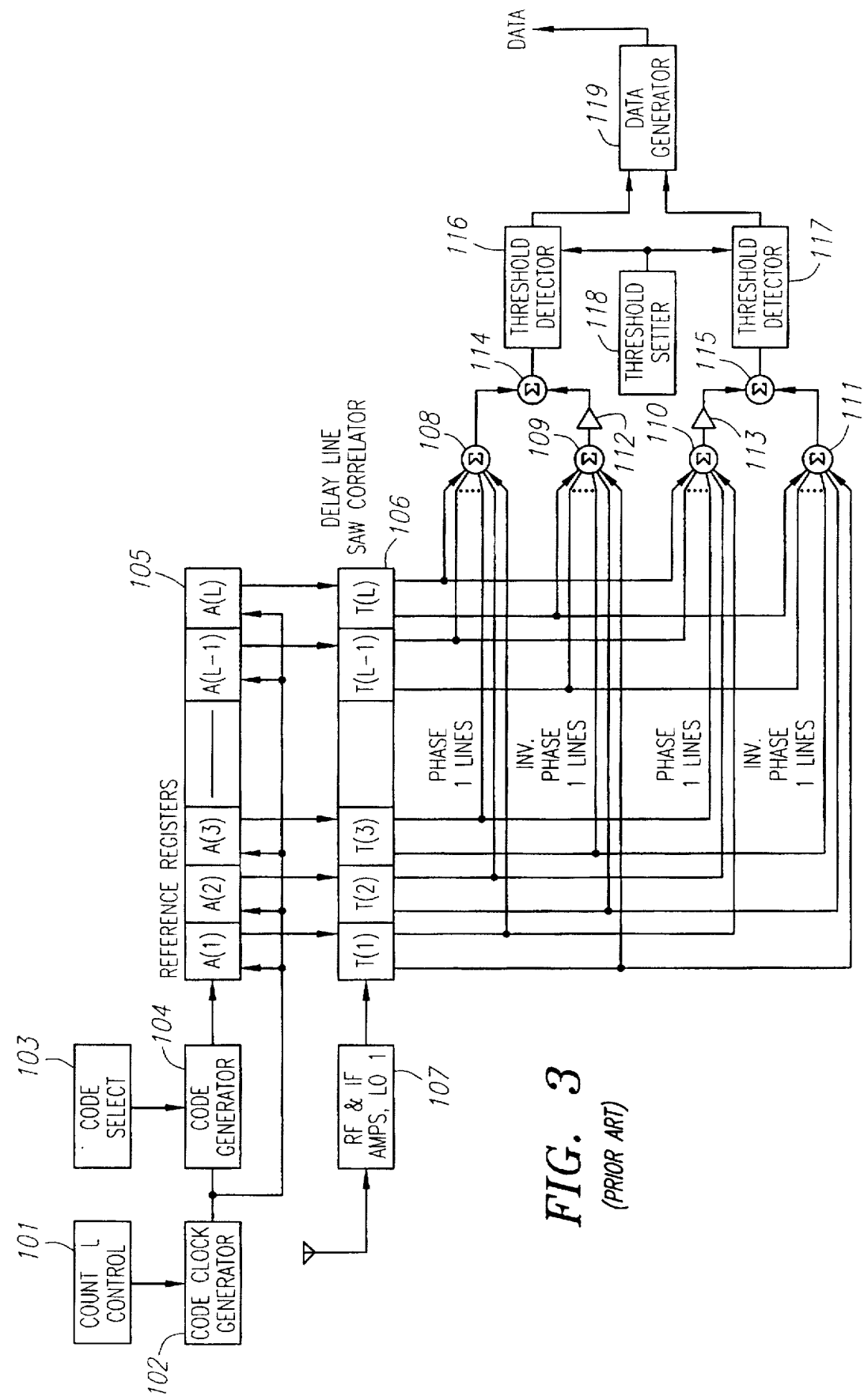
FIG. 3 is a diagram of a prior art SAW correlator for use in a spread spectrum system.

FIG. 3 is a block diagram of a SAW correlator as is known in the prior art. The FIG. 3 correlator may be used in a system employing an M-ary communication technique. In a particular spread spectrum M-ary technique, a unique spread spectrum code is associated with a unique series of data bits. For example, in a 4-ary spread spectrum system, four spread spectrum codes may be used to transmit four possible data symbols, each of the four data symbols representing a unique series of two data bits—00, 01, 01 or 11. More generally, M spread spectrum codes (referred to as a "symbol code" in the context of an M-ary system) may be used to transmit up to M different data symbols, each comprised of M log-2 data bits. Thus, where each data symbol is five data bits long, 32 symbol codes may be used to transmit up to 32 unique data symbols each comprised of a unique series of five data bits. When a particular spread spectrum code is received, the corresponding data information may be recovered by identifying which of M symbol codes was received.

A spread spectrum signal may include a symbol code having L bits produced with a clock rate equivalent to $L \cdot (R_d/S_d)$, where $R_d$ is the clock rate of the data to be modulated, and $S_d$ is the number of data bits per code segment of length L. For example, if the data rate to be transmitted for one data bit is 100 kHz, and the code length L is 100, then the code rate $R_c$ is equivalent to $L \cdot (R_d/S_d) = (100) \cdot (100 \text{ kHz}/1) = 10$ MHz. For two data bits per code, the data rate rises to 200 kHz, but the code rate stays the same—that is, $R_c = (100) \cdot (200 \text{ kHz}/2) = 10$ MHz. Thus, the data rate can increase without a like increase in the code rate.

In an M-ary system, a receiver may employ a plurality of correlators, such as the correlator shown in FIG. 3, in parallel to detect the various symbol codes which may be transmitted. To detect M symbol codes, for example, M different individual correlators may operate in parallel. Symbol codes equivalent to those used by the transmitter may be loaded into the storage elements of the M correlators and held stationary. The received signal is then passed through each correlator, and when the correlation value from correlator one exceeds a threshold value T, a correlation signal is produced.

In a particular M-ary technique, inverse symbol codes are used to represent data symbols. Thus, for a system requiring use of 16 data symbols, for example, eight symbol codes and their eight inverses may be used to represent all 16 data symbols. In such a technique, a second threshold may be used in the correlator to detect the inverse symbol code. If the correlation value is less than L–T, a second correlation signal may be produced. Each correlator thus produces a correlation signal and, if inverse symbol codes are employed, may produce a second correlation signal.

In order to achieve the desired correlation, the correct reference code must be "loaded" onto the FIG. 3 SAW device. The present discussion is for a BPSK device, but may be extended to include other PSK techniques such as MSK, QPSK, etc. Assuming a bi-phase shift keyed signal, phase reversals would occur at each one/zero transition of the spreading code. This may be accomplished in at least two ways. The first is through a programmable correlator which can output all phases in each element. The second is through a non-programmable correlator.

A programmable correlator can be constructed so as to be capable of outputting all phases in each element. As illustratively shown in FIG. 3, for example, for a bi-phase shift keyed device a count controller 101 controls a code clock generator 102 which sends L clock signals to a code generator 104 and reference registers 105. Code generator 104 then produces a unique code as determined by code selector 103 and loads it into reference registers 105. Once the code is stored in reference registers 105, the zero/one pattern is loaded into delay line correlator 106, with the contents of register A(2) connected to element T(2), and so on to element A(L). The correlator is then programmed so that all the outputs of the elements corresponding to a first symbol code are connected to summing devices 108, 110 and all outputs of the elements corresponding to a second symbol code are connected to summing devices 109, 111. In this example, a first symbol code may be embodied as a first phase symbol, and a second symbol code may be embodied as a second phase symbol.

In non-programmable devices, these phase shifts are programmed at the time of construction through transducers placed in each element to produce an elemental phase match and cannot be changed by the user, thus allowing only one code sequence to be correlated. Inverted and non-inverted phase elements are then summed together just as in the programmable device.

When a signal with a pseudo-noise ("PN") code, PSK modulation, and RF frequency equivalent to that in the SAW correlator is received, then the received signal is amplified (and may be down-converted, although down conversion to an IF frequency is not preferred unless necessary) and fed to delay line correlator 106, whereupon it is translated into acoustical energy and propagated as a surface wave. As the wave propagates across the surface of the SAW correlator, the energy in each delay element increases by a factor determined by the phase of the reference elements versus the received signal phase.

The output of the delay elements which are in phase with the first phase are summed in summers 108, 110, while those elements which are 180° out of phase with the first phase are summed in summers 109, 111. When a non-inverted code segment, PSK modulated signal with the same PN code phase shifts as those referenced in the correlator propagates through the device and the first code chip reaches the end of the delay line, all the phase shifts of the received signal match those of the elements comprising the correlator, and a first phase maximum energy is obtained. The output of inverted first phase summer 109 is inverted by phase inverter 112 and summed in phase with the output of first phase summer 108 in summer 114. If the output of summer 114 exceeds the threshold set in threshold detector 116 by threshold setter 118, a first symbol code correlation signal is generated by threshold detector 116 and fed to data generator 119, which produces a first data symbol signal.

When an inverted code segment, PSK modulated signal with the same non-inverted PN code phase shifts as those referenced in the correlator propagates through the device and the first code chip reaches the end of the delay line, all the phase shifts of the received signal match those of the elements comprising the correlator, and an inverted first phase maximum energy is obtained. The output of the first phase summer 110 is inverted by phase inverter 113 and summed in phase with the output of inverted first phase summer 111 in summer 115. If the output of summer 115 exceeds the threshold set in threshold detector 117 by threshold setter 118, a second symbol code correlation signal is generated by threshold detector 117 and fed to data generator 119, which produces a second data symbol signal.

Further details regarding the SAW correlator of FIG. 3 may be found in U.S. Pat. No. 5,016,047 entitled "Spread Spectrum Correlator" issued to Robert C. Dixon and Jeffrey S. Vanderpool and hereby incorporated by reference as if fully set forth herein.

Figure 4:
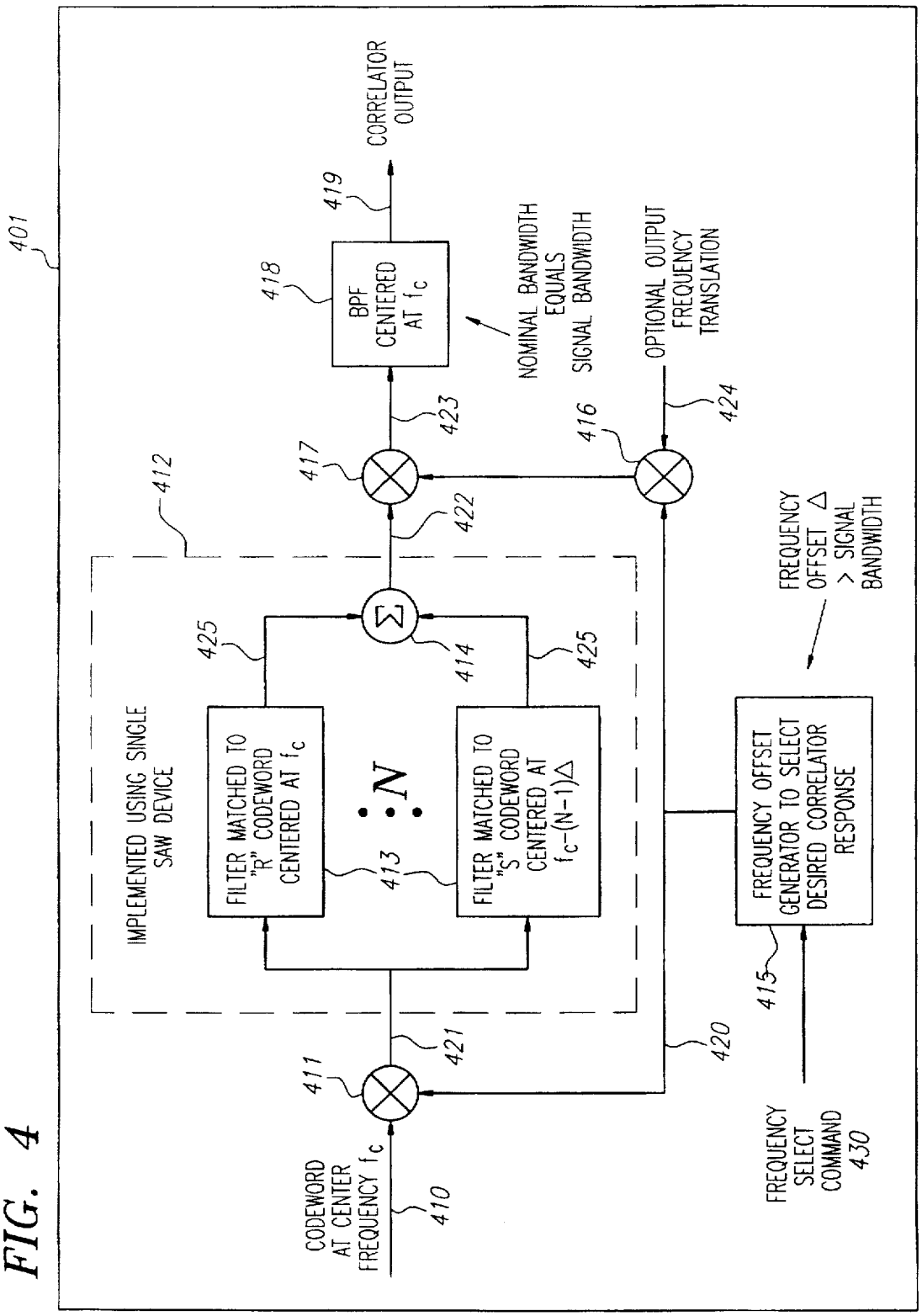
FIG. 4 is a block diagram of one embodiment of a SAW correlator for recognizing a plurality of chip codes.

FIG. 4 is a functional block diagram of a correlator 401 in accordance with one embodiment of the present invention for recognizing a plurality of chip codes.

The correlator 401 comprises a first multiplier 411, a multi-programmed SAW device 412, a frequency offset generator 415, a second multiplier 417, and a bandpass filter 418. An input signal 410, presumably a spread spectrum signal, is received and provided to the correlator 401. The received signal may be downconverted from a radio frequency to an intermediate frequency before being provided to the correlator 401, so that input signal 410 may be either an RF signal or an IF signal, depending upon the operating characteristics of the SAW device 412. Due to frequency response limitations of SAW devices, the input signal 410 is preferably not a baseband signal.

The input signal 410 is assumed to comprise one or more spread spectrum codes selected from a predefined group of spread spectrum codes. For example, a handset incorporating the correlator 401 may have available for communication with a base station a predefined set of spread spectrum codes, or may have downloaded from the base station in a dynamic manner a spread spectrum code for communication. A receiver at either the handset or the base station may therefore need to be able to recognize and correlate to a number of different spread spectrum codes.

The input signal 410 is assumed to have a center frequency $f_c$, and is coupled to an input of multiplier 411. Another input of the multiplier 411 is coupled to the frequency offset generator 415. The frequency offset generator 415 generates an offset signal 420 having a variable frequency $f_o$, where $f_o$ is preferably greater than the bandwidth of the input signal 410 and is selected as a multiple of a frequency constant $\Delta$. The selection of frequency $f_o$, as explained further herein, depends on the particular spread spectrum code to which the correlator 401 is attuned at a given instant in time. Multiplier 411 is preferably (but need not be) a single sideband mixer that combines its inputs and produces a SAW input signal 421 centered at a frequency $f_c-f_o$. The SAW input signal 421 is provided to the multi-programmed SAW device 412.

The multi-programmed SAW device 412 comprises a plurality of "virtual" filters 413, each of which is matched to a different spread spectrum code. Each of the filters 413 is physically realized on a single SAW device, and not as a separate element, and hence is termed a "virtual" filter herein. Each virtual filter 413 represents a different transfer function associated with a single physical SAW structure embodying all of the virtual filters 413, as further described herein.

Each of the virtual filters 413 is matched to a different spread spectrum code, although they are physically fabricated on a single multi-programmed SAW device 412. Thus, a first virtual filter 413 is matched to a first spread spectrum code, a second virtual filter 413 is matched to a second spread spectrum code, and so on, for a total of N spread spectrum codes. Each of the virtual filters 413 is also attuned to a different frequency, with the difference between each adjacent frequency being equal to $\Delta$. Thus, the virtual filter 413 matched to the first spread spectrum code is attuned to a frequency $f_c$, the virtual filter 413 matched to the second spread spectrum code is attuned to a frequency $f_c-\Delta$, the virtual filter 413 matched to the third spread spectrum code is attuned to a frequency of $f_c-2\Delta$, and so on, up to the Nth virtual filter 413 matched to the Nth spread spectrum code and attuned to a frequency $f_c-(N-1)\Delta$.

Each of the virtual filters 413 generates an output signal 425. The filter output signals 425 are combined by a virtual summer 414 (e.g., transducer(s)), which outputs a SAW output signal 422. If embodied as a transducer, the virtual summer 414 will ordinarily be part of the same physical SAW device as the virtual filters 413, constructed, for example, in a manner as described previously with respect to FIG. 2. Thus, virtual summer 414 is so named because, in a preferred embodiment, it is not a separate physical component, but rather represents the inherent summing property of the SAW transducers.

The multi-programmed SAW device 412 takes advantage of the linear characteristics of SAW devices. Because a SAW device is linear and passive, the principles of superposition may be applied to the SAW operations. Under principles of superposition, the aggregate time response for all of the chip codes at selected offset frequencies is simply the sum of the time responses for each of the chip codes at the selected offset frequencies. Thus, the aggregate time response for a SAW device for matching to a plurality of chip codes may be determined by summing the individual time responses of the plurality of chip codes at the selected offset frequencies. Once the desired aggregate time response has been determined, a SAW device may be constructed to match the aggregate time response by use of a suitable finger pattern matched to the frequency, amplitude and phase characteristics of the aggregate time response.

The SAW output signal 422 is coupled to multiplier 417. Another input of multiplier 417 may be coupled directly to the frequency offset generator 415. Alternatively, that input of multiplier 417 may be coupled to an additional multiplier 416 in the event that frequency translation is desired. The output 423 of the multiplier 417 is coupled to a bandpass filter 418. The bandpass filter 418 is configured to have a center frequency of $f_c$, and a nominal bandwidth equal to the bandwidth of the input signal 410. The bandpass filter 418 provides a correlator output signal 419.

In operation, the input signal 410 and offset signal 420 are combined, as noted, by multiplier 411 to generate a SAW input signal 421. The offset signal 420 preferably comprises a sine wave. The frequency of the offset signal 420 is selected by the frequency offset generator 415 and depends upon the particular spread spectrum code to be matched. In the FIG. 4 embodiment, in order to match the first spread spectrum signal, no frequency offset is necessary; thus, the frequency offset signal 420 is set to zero. To match the second spread spectrum code, the offset signal 420 is selected to have a frequency of $\Delta$, while to match the third spread spectrum code, the offset signal 420 is selected to have a frequency of $2\Delta$, and so on. Thus, when matched to the first spread spectrum code, the SAW input signal 421 generated by multiplier 411 has a center frequency of $f_c$; when matched to the second spread spectrum code, the SAW input signal 421 has a center frequency of $f_c-\Delta$; when matched to the third spread spectrum code, the SAW input signal 421 has a center frequency of $f_c-2\Delta$; and so on, up to the Nth spread spectrum code, in which case the SAW input signal 421 has a center frequency of $f_c-(N-1)\Delta$.

The frequency offset generator 415 may be embodied as a voltage controlled oscillator responsive to a command signal 430 for selecting one from among a group of different spread spectrum codes. The selection command signal 430 thus causes an increase in frequency of the offset signal 420 in discrete steps of $\Delta$. Although multiplier 411 in the present embodiment has been described as providing a negative offset to the input signal 410, it could also work by providing a positive offset by adding offset signal 420 instead of subtracting it, in which case the multi-programmed SAW device 412 would be tuned in the opposite direction than described, and multiplier 417 would provide a negative offset instead of positive offset.

The multi-programmed SAW device 412 receives the SAW input signal 421 and provides it to a single filter comprising all of the virtual filters 413 in one element. Because each virtual filter 413 is attuned to a different frequency, only the virtual filter 413 attuned to the specific frequency of the SAW input signal 421 correlates thereto. For example, to match to the first spread spectrum signal, the offset signal 420 is set to zero, as noted, and the SAW input signal 421 will be centered at frequency $f_c$. The virtual filter 413 attuned to frequency $f_c$ then correlates to the SAW input signal 421 and, when a match occurs, generates a correlation pulse in output signal 425. None of the other virtual filters 413 correlate (except incidentally) to the SAW input signal 421, as each of the other virtual filters 413 is attuned to a frequency other than $f_c$, and is separated therefrom by at least a full bandwidth of the input signal 410.

As another example, assume it is desired to match to the second spread spectrum code, in which case the offset signal 420 is selected as a sine wave having a frequency $\Delta$. The SAW input signal 421 is thus centered at frequency $f_c-\Delta$. The virtual filter 413 attuned to frequency $f_c-\Delta$ correlates to the SAW input signal 421 and, when a match occurs, generates a correlation pulse in output signal 425. None of the other virtual filters 413 correlate (except incidentally) to the SAW input signal 421, as each of the other virtual filters 413 is attuned to a frequency other than $f_c-\Delta$, and is separated therefrom by at least a full bandwidth of the input signal 410.

The same type of process occurs with respect to the other spread spectrum codes to which the correlator 401 can be matched, up to the Nth spread spectrum code. In each case, the appropriate frequency offset is selected and generated by frequency offset generator 415, and only one virtual filter 413 substantially correlates to the SAW input signal 421 so long as the same frequency offset is maintained.

The outputs 425 from each of the virtual filters 413 are summed by virtual summer 414; however, only one output 425 will have a correlation pulse indicative of a match with the received spread spectrum signal. When the filter output signals 425 are combined by virtual summer 414, the virtual summer 414 generates a SAW output signal 422 having a maximum correlation pulse when the appropriate matched virtual filter 413 generates a maximum correlation pulse.

After filtering by the SAW device 412, the SAW output signal 422 is downconverted by multiplier 417, so as to return the signal originally offset by multiplier 411 to the center frequency $f_c$. Multiplier 417 receives the same offset signal 420 as multiplier 411 (unless frequency translation is desired, in which case multiplier 417 receives a signal corresponding to the translation frequency), but instead of subtracting the offset signal 420, adds it. In the case where multiplier 411 generates a signal having a center frequency of $f_c-f_o$, multiplier 417 may be embodied as a single sideband mixer generating an output signal 423 having a frequency of $(f_c-f_o)+f_o=f_c$. The output signal 423 thereby is returned to the center frequency $f_c$.

The output 423 of multiplier 417 is provided to the bandpass filter 418. The bandpass filter 418 filters the output signal 423 at a center frequency of $f_c$, and generates correlator output signal 419. Because the relevant correlation information in the output signal 423 is centered at a single frequency $f_c$, regardless of which spread spectrum code is programmed, the FIG. 4 embodiment has the advantage of using only a single bandpass filter 418.

Figure 6A:
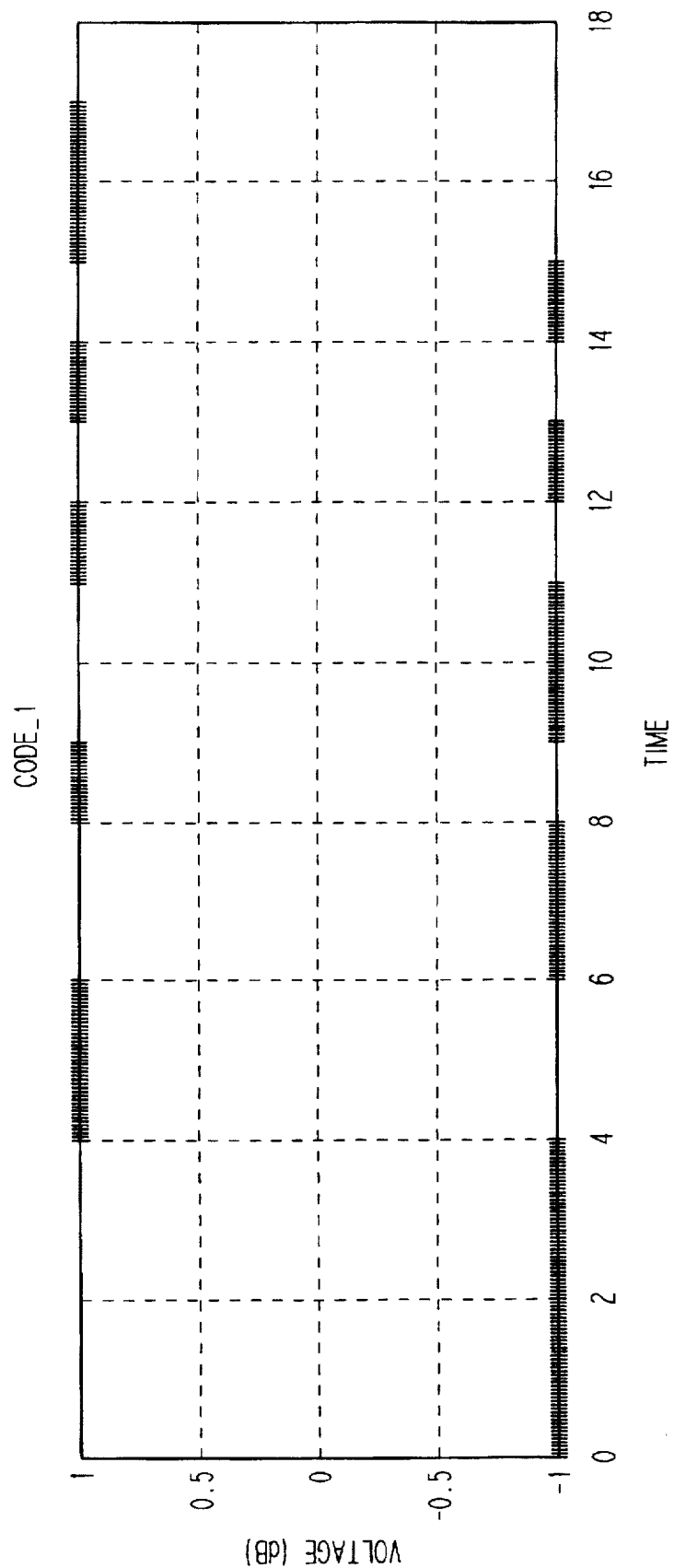
FIGS. 6A and 6B are waveform diagrams of codewords in an exemplary 2-ary system.
Figure 6B:
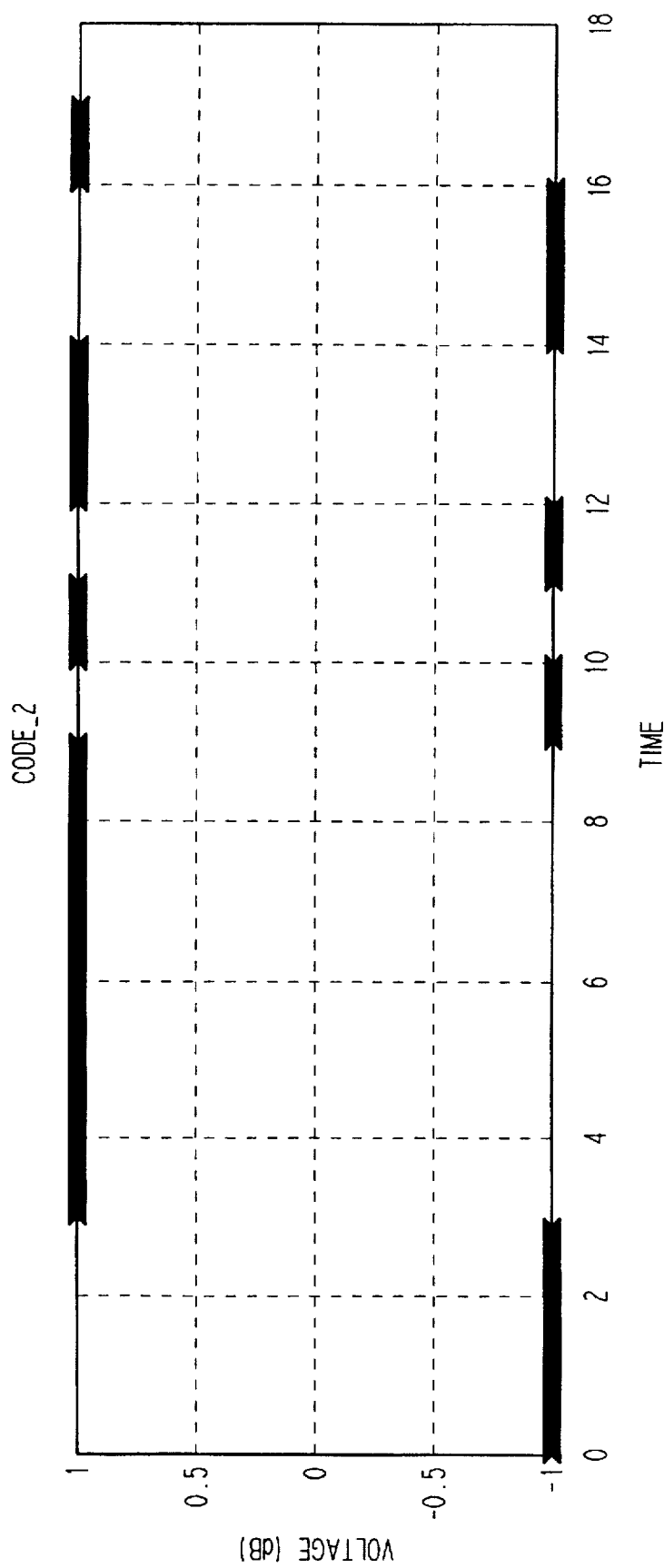

An example of a 2-ary system in accordance with the FIG. 4 embodiment may be explained with reference to FIGS. 6A–6B, 7A–7B, and 8A–8B. The waveforms shown in these Figures have been simulated using MATLAB simulation software. Two codewords (i.e., spread spectrum codes) C1 and C2 of length 17 chips are shown in the graphs of FIGS. 6A and 6B. The waveforms have a plurality of "−1" voltage levels which may be represented as binary "0"s and a plurality of "+1" voltage levels which may represented as binary "1"s. Thus, the codeword C1 associated with the FIG. 6A graph has a binary representation of "00001100100101011". Likewise, the codeword C2 associated with the FIG. 6B graph has a binary representation of "00011111101011001". These particular codewords C1 and C2 have been selected for minimal peak sidelobe pulse compression and low cross-correlation.

FIGS. 7A and 7B are graphs showing expected responses of matched filters configured for the first codeword C1 and the second codeword C2, respectively. Thus, FIG. 7A shows a response 701 of the first codeword C1 input to a matched filter attuned to codeword C1, and a response 702 of the second codeword C2 input to the same matched filter. As shown in FIG. 7A, the response 701 associated with codeword C1 shows a correlation peak 703 after 17 chips have been received, whereas the response 702 associated with codeword C2 shows no similar correlation peak.

In a similar fashion, FIG. 7B shows a response 712 of the second codeword C2 input to a matched filter attuned to codeword C2, and a response 711 of the first codeword C1 input to the same matched filter. As shown in FIG. 7B, the response 712 associated with codeword C2 shows a correlation peak 713 after 17 chips have been received, whereas the response 711 associated with codeword C1 shows no similar correlation peak.

Figure 8A:
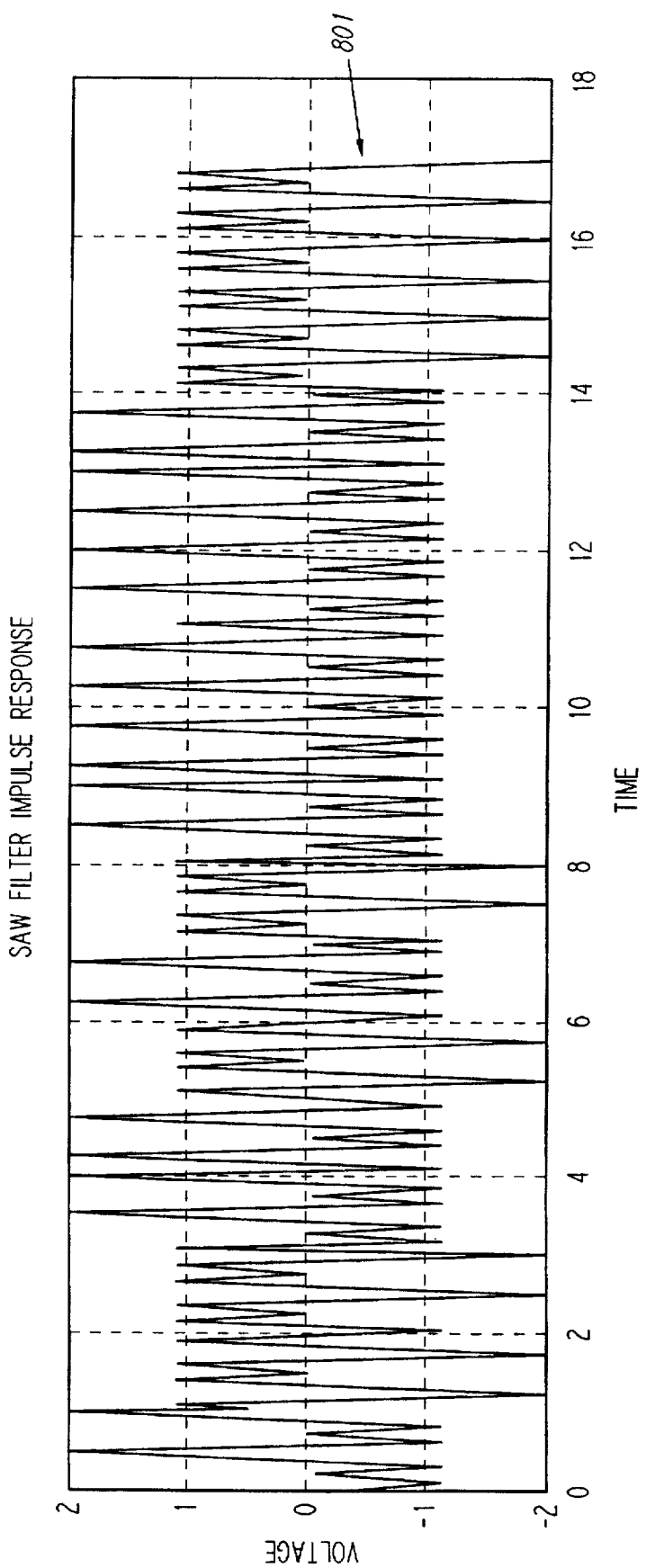
FIG. 8A is a graph of an impulse response of a multi-programmed SAW device, combining the impulse responses of a virtual filter configured to recognize the codeword of FIG. 6A at a frequency of 2 MHz and a virtual filter configured to recognize the codeword of FIG. 6B at a frequency of 4 MHz.

In the present example, the multi-programmed SAW device 412 combines the characteristics of two matched filters into a single device. Assume, for example, a chipping rate of 1 MHz and a frequency separation $\Delta$ of 2 MHz. Then the virtual filter 413 configured to recognize codeword C1 in SAW device 412 may be centered at a frequency of, e.g., 2 MHz, and the virtual filter 413 configured to recognize codeword C2 may be centered at a frequency $\Delta$ apart from 2 MHz—i.e., at 4 MHz. Both virtual filters 413 are embodied in a single SAW filter having an impulse response as shown in FIG. 8A. The impulse response 801 shown in FIG. 8A is the aggregate impulse response of the virtual filter 413 configured to recognize codeword C1 at a frequency of 2 MHz and the virtual filter 413 configured to recognize codeword C2 at a frequency of 4 MHz. The finger pattern, length, and spacing of the multi-programmed SAW device 412 are configured so as to provide an impulse response matching that shown in FIG. 8A.

It should be noted that the frequencies selected for this example (in the 2 MHz to 4 MHz range) are for purposes of illustration only, and that center frequencies in the range of 350 MHz to 700 MHz are more realistic in practical SAW applications.

Figure 8B:
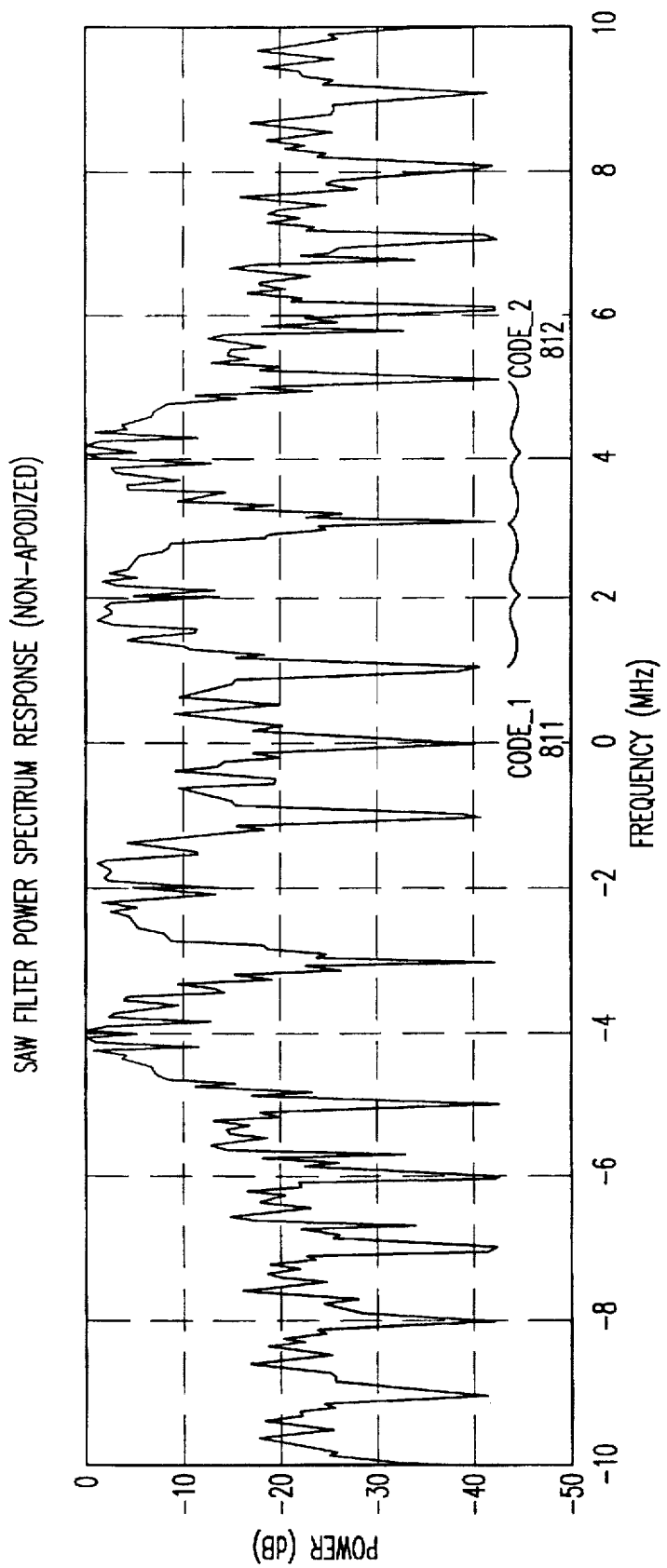
FIG. 8B is a graph of the power amplitude frequency response of the filter (e.g., SAW device) of FIG. 8A.

FIG. 8B is a graph of the power amplitude frequency response of the filter of FIG. 8A, obtained by taking the Fourier transform of the impulse response 801 shown in FIG. 8A and conjugate squaring. Two prominent responses 811 and 812 are shown in the graph of FIG. 8B. One response 811 (corresponding to codeword C1) is centered at 2 MHz and the other response 812 (corresponding to codeword C2) is centered at 4 MHz. The approximate total bandwidth necessary for the SAW device 412 is therefore roughly 4 MHz, from 1 MHz to 5 MHz. If a 4-ary system is built with similar parameters, the approximate total bandwidth necessary would be roughly 8 MHz, or 2 MHz for each code. Thus, by exploiting the high device bandwidth of SAW filters, only one filter can be used to detect a plurality of different codewords.

In operation, the multiplier 411 multiplies an incoming signal 410 by a frequency dependent upon which of the two codewords the receiver is programmed to detect. The incoming signal 410, as noted, is assumed to have a chipping rate of 1 MHz, and may be translated if necessary upon reception to a center frequency $f_c$ of 4 MHz. If the receiver is programmed to detect codeword C1, then the multiplier 411 multiplies the incoming signal 410 by a sine wave of frequency $f_c-(M-1)\cdot\Delta=4$ MHz$-(2-1)\cdot 2$ MHz$=2$ MHz, and if programmed to detect codeword C2, then the multiplier 411 multiplies the incoming signal 411 by a constant (or simply lets the incoming signal 410 pass unaffected).

Assuming that the receiver is programmed to detect codeword C1, then the multiplier 411 downconverts the incoming signal 410 to 2 MHz and applies it to the multi-programmed SAW device 412. The virtual filter 413 attuned to codeword C1 produces a prominent correlation peak when codeword C1 is received, but the virtual filter 413 attuned to codeword C2 does not produce a prominent correlation peak. The output of the SAW device 412 is upconverted by multiplier 417 back to 4 MHz, and is provided to bandpass filter 418, which has a center filtering frequency of 4 MHz. Bandpass filter 418 passes the correlation pulse associated with codeword C1, and the receiver may respond thereto.

If a different spread spectrum code (e.g., codeword C2) is received while the receiver is programmed to recognize codeword C1, then the virtual filter 413 attuned to codeword C1 will not produce a prominent correlation peak because it is not configured to match codeword C2. The virtual filter 413 attuned to codeword C2 will also not produce a prominent correlation peak because it is not configured to match at a frequency of 2 MHz, but only at a frequency of 4 MHz. Thus, reception of codeword C2 (or any other non-programmed code) will not cause a correlation pulse, and therefore not cause a false recognition.

Similarly, if the receiver is programmed to detect codeword C2, then the multiplier 411 may simply multiply the incoming signal 410 by a constant and apply it to the multi-programmed SAW device 412. The virtual filter 413 attuned to codeword C2 produces a prominent correlation peak when codeword C2 is received, but the virtual filter 413 attuned to codeword C1 does not produce a prominent correlation peak. Because the incoming signal 410 was not downconverted, the output of the SAW device 412 need not be upconverted by multiplier 417. The output signal 422 from the SAW device 412 is provided unchanged to bandpass filter 418, which passes the correlation pulse associated with codeword C2.

If a different spread spectrum code (e.g., codeword C1) is received while the receiver is programmed to recognize codeword C2, then the virtual filter 413 attuned to codeword C2 will not produce a prominent correlation peak because it is not configured to match codeword C1. The virtual filter 413 attuned to codeword C1 will not produce a prominent correlation peak because it is not configured to match at a frequency of 4 MHz, but only at a frequency of 2 MHz. Thus, reception of codeword C1 (or any other non-programmed code) will not cause a correlation pulse, and therefore not cause a false recognition.

The FIG. 4 correlator therefore permits the recognition and correlation of N spread spectrum code sequences, while using fewer than N SAW devices, and preferably a single SAW device. The FIG. 4 system may be suitable, for example, in a system for cellular communications wherein mobile stations (e.g., handsets) travel from cell to cell and require handoff between base stations. If different preambles are used by different base stations for communication, then a correlator such as shown in FIG. 4 incorporated in the mobile station may choose as necessary from among the preambles so as to allow the mobile station to communicate with one base station in one cell and another base station in the next cell, thereby providing for seamless coverage from cell to cell. The FIG. 4 correlator may also be suitable for various radar applications where it may be necessary to correlate to different spread spectrum code sequences.

Figure 5:
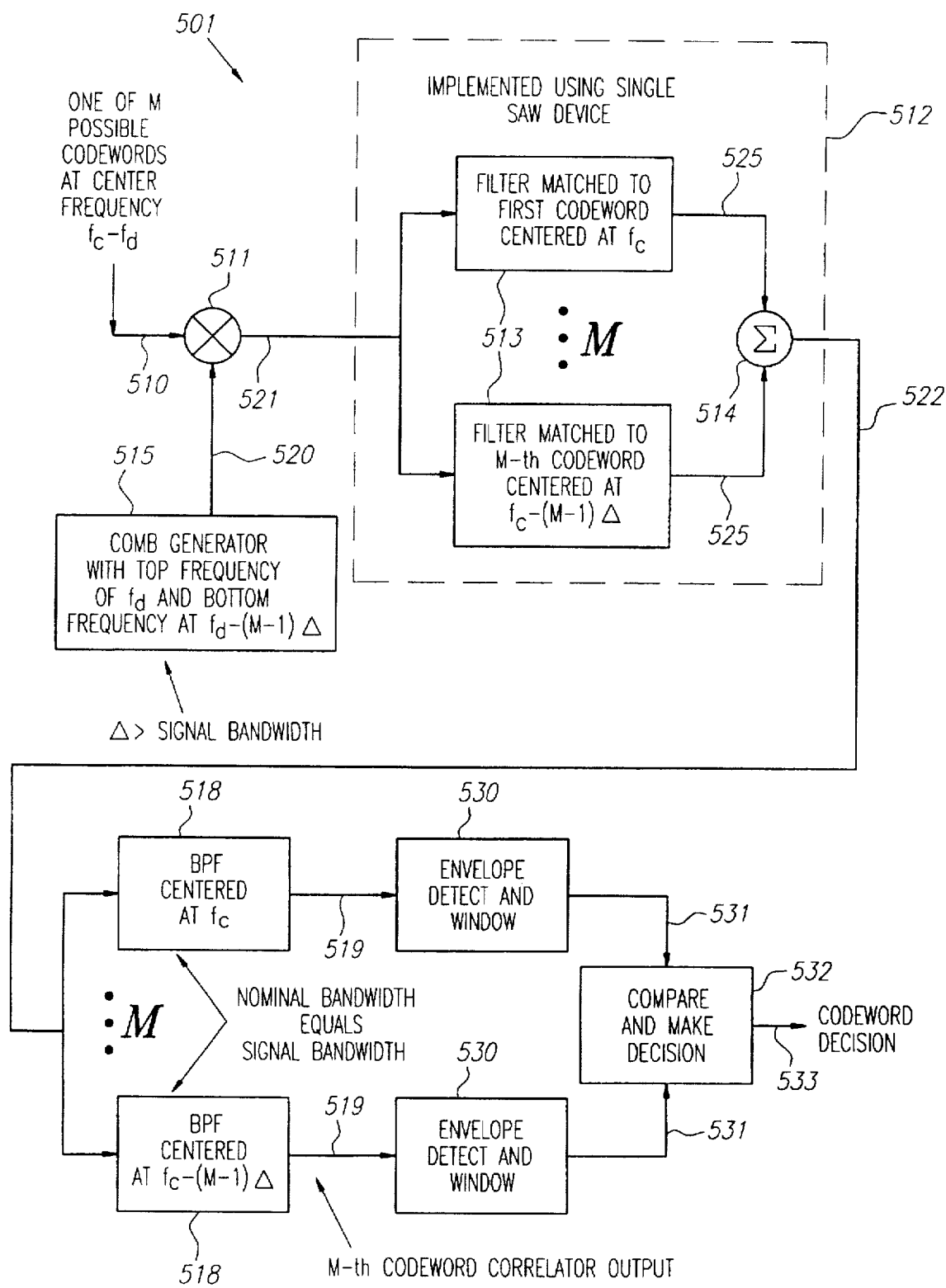
FIG. 5 is a block diagram of another embodiment of a SAW correlator for recognizing a plurality of chip codes.

FIG. 5 is a block diagram of a SAW correlator 501 capable of simultaneously recognizing a plurality of chip codes.

The SAW correlator 501 comprises a first multiplier 511, a multi-programmed SAW device 512, a comb generator 515, a plurality of bandpass filters 518, a plurality of envelope detect and window circuits 530, and a compare and decision circuit 532. An input signal 510, presumably a spread spectrum signal, is received and provided to the correlator 501. The received signal may be downconverted from a radio frequency to an intermediate frequency before being provided to the correlator 501, so that input signal 510 may be either an RF signal or an IF signal. Due to frequency response limitations of SAW devices, the input signal 510 is preferably not a baseband signal.

The input signal 510, as with the FIG. 4 device, may comprise one or more spread spectrum codes selected from a predefined group of spread spectrum codes. The input signal 510 is assumed to have a center frequency $f_c-f_d$, and is coupled to an input of multiplier 511. Another input of the multiplier 511 is coupled to the comb generator 515. The comb generator 515 generates a multi-frequency signal 520 having a top frequency of $f_d$ and a bottom frequency of $f_d-M\Delta$, where each frequency component in multi-frequency signal 520 is preferably separated from the top frequency $f_d$ by a multiple of frequency constant $\Delta$. The selection of top frequency $f_d$ is therefore constrained by the number of spread spectrum codes used and the size of the frequency constant $\Delta$. The frequency constant $\Delta$ is preferably greater than the bandwidth of the input signal 510.

Multiplier 511 is preferably (but need not be) a single sideband mixer that combines its inputs and produces a SAW input signal 521 having a plurality of frequency components centered at frequencies $f_c$, $f_c-\Delta$, $f_c-2\Delta$, ..., $f_c-M\Delta$. The SAW input signal 521 is provided to the multi-programmed SAW device 512.

The multi-programmed SAW device 512 is similar to the multi-programmed SAW device 412 of FIG. 4 and comprises a plurality of virtual filters 513, each of which is matched to a different spread spectrum code. Thus, a first virtual filter 513 is matched to a first spread spectrum code, a second virtual filter 513 is matched to a second spread spectrum code, and so on, for a total of M spread spectrum codes. All of the virtual filters 513 are physically fabricated on a single multi-programmed SAW device 512. However, each of the virtual filters 513 is attuned to a different frequency, with the difference between each frequency being equal to $\Delta$. Thus, the virtual filter 513 matched to the first spread spectrum code is attuned to a frequency $f_c$, the virtual filter 513 matched to the second spread spectrum code is attuned to a frequency $f_c-\Delta$, the virtual filter 513 matched to the third spread spectrum code is attuned to a frequency of $f_c-2\Delta$, and so on, up to the Mth virtual filter 513 matched to the Mth spread spectrum code and attuned to a frequency $f_c-(M-1)\Delta$.

Each of the virtual filters 513 generates an output signal 525. The filter output signals 525 are combined by a virtual summer 514 (e.g., transducer(s), which may be embodied as a part of the same physical SAW device 512, as described with respect to FIG. 2), which outputs a composite SAW correlation signal 522. Like the SAW device 412 of FIG. 4, the structure of the SAW device 512 takes advantage of the linear characteristics of SAW devices, and the principles of superposition may be applied. Under principles of superposition, the aggregate time response for all of the chip codes at selected offset frequencies is simply the sum of the time responses for each of the chip codes at the selected offset frequencies.

The composite SAW correlation signal 522 is coupled to each of the bandpass filters 518. Each bandpass filter 518 is configured to have a center frequency matching one of the virtual filters 513 of the SAW device 512. Thus, one bandpass filter 518 operates at a center frequency of $f_c$, another bandpass filter 518 operates at a center frequency of $f_c-\Delta$, another bandpass filter 518 operates at a center frequency of $f_c-2\Delta$, and so on. Each bandpass filter 518 has a nominal bandwidth preferably equal to the bandwidth of the input signal 510.

The output 519 from each bandpass filter 518 is coupled to one of the envelope detect and window circuits 530. The output 531 from each of the envelope detect and window circuits 530 is coupled to a compare and decision circuit 532, which generates a correlator output signal 533 (comprising, for example, a sequence of selected symbol codes or data symbols).

In operation, the input signal 510 and multi-frequency signal 520 are combined, as noted, by multiplier 511 to generate a SAW input signal 521. The multi-frequency signal 520 preferably comprises a plurality of sine waves. The sine waves have a top frequency of $f_d$ and a bottom frequency of $f_d-M\Delta$. Thus, one of the sine waves has a center frequency equal to the top frequency $f_d$, and each of the other sine waves is preferably separated from the top frequency $f_d$ by a multiple of frequency constant $\Delta$.

Multiplier 511 combines the input signal 510 and the multi-frequency signal 520, and thereby generates a SAW input signal 521 having a plurality of frequency components centered at frequencies $f_c$, $f_c-\Delta$, $f_c-2\Delta$, ..., $f_c-M\Delta$. The SAW input signal 521 is provided to the multi-programmed SAW device 512.

The multi-programmed SAW device 512 receives the SAW input signal 521 and provides it to virtual filters 513. Because each virtual filter 513 is attuned to a different frequency, each virtual filter 513 operates on a separate frequency portion of the SAW input signal 521 and correlates thereto. Thus, the virtual filter 513 centered at frequency $f_c$ filters a frequency component of the SAW input signal 521 centered at frequency $f_c$ and, when a match occurs, generates a correlation pulse in output signal 525 centered at frequency $f_c$. Likewise, the filter centered at frequency $f_c-\Delta$ filters the frequency component of the SAW input signal 521 centered at frequency $f_c-\Delta$ and, when a match occurs, generates a correlation pulse in output signal 525 centered at frequency $f_c-\Delta$. The same process occurs with respect to the other frequency components of the SAW input signal 521, up to the Mth frequency component. In each case, the appropriate frequency portion is correlated by the corresponding virtual filter 513, which generates an output signal 525 centered at the same frequency to which the virtual filter 513 is attuned. The SAW device 512 thereby simultaneously correlates for all possible chip code sequences expected in the input signal 510.

The outputs 525 from each of the virtual filters 513 are summed by virtual summer 514, which generates a composite SAW correlation signal 522 having a plurality of frequency components separated by increments of $\Delta$. The composite SAW correlation signal 522 is coupled to the plurality of bandpass filters 518, each of which filters one of the frequency components of the composite SAW correlation signal 522. An output 519 from each of the bandpass filters 518 is coupled to one of the envelope detect and window circuits 530. Each envelope detect and window circuit 530 detects the envelope of the bandpass output 519 by any suitable envelope detection means known in the art, and thereby obtain a measurement the magnitude of the bandpass output 519.

Each envelope detect and window circuit 530 may also provide time windowing, if desired, to decrease sensitivity to noise during times when a correlation pulse from one of the band pass filters 518 is not expected. For example, the system may be synchronized, by use of a preamble or otherwise, so that a time window only opens at predetermined intervals during which a correlation output may be generated. In an M-ary system, once a first symbol code has been detected, subsequent symbol codes will be expected to appear approximately L chips later in time. The envelope detect and window circuit 530 may therefore be operative during a predefined period or time window immediately preceding and immediately following L chips after the previous symbol code was detected. Extraneous correlation pulses generated outside of this time window will be ignored and will be assumed to be the result of noise or other interference.

Although certain specific examples of synchronization and time windowing are discussed herein, it will be appreciated that there are a variety of other methods for carrying out synchronization and time windowing. The particular examples mentioned herein are illustrative and are not meant to be limiting.

The output 531 from each of the envelope detect and window circuits, 530 is coupled to a compare and decision circuit 532. The compare and decision circuit 532 compares the outputs from each of the envelope detect and window circuits 530, and ascertains which represents the greatest correlation between the SAW input signal 521 and the corresponding SAW virtual filter 513. For example, the compare and decision circuit 532 may select the largest of the outputs 531 from the envelope and detect circuits 530. In response to selecting the signal with the highest correlation level, the compare and decision circuit 532 generates a correlator output signal 533. In a spread spectrum system using M-ary encoding techniques, the compare and decision circuit 532 may comprise a lookup table, and the correlator output signal 533 may in such a case comprise a data symbol corresponding to the spread spectrum codeword having the highest correlation value.

Operation of the FIG. 5 receiver may be explained with reference to FIGS. 6A–6B, 7A–7B, 8A–8B, 9A–9B, 10A–10B and 11A–11B. The same codewords shown in FIGS. 6A and 6B used to describe operation of the FIG. 4 receiver in a particular 2-ary system may also be used to illustrate operation of the FIG. 5 receiver as well in a similar 2-ary system. Assume again a chipping rate of 1 MHz and a frequency separation $\Delta$ of 2 MHz. The virtual filter 513 configured to recognize codeword C1 in SAW device 512 may be centered at a frequency of, e.g., 2 MHz, and the virtual filter 513 configured to recognize codeword C2 may be centered at a frequency $\Delta$ apart from 2 MHz—i.e., at 4 MHz. Both virtual filters 513 may be embodied in a single SAW filter structure having an impulse response as shown in FIG. 8A.

Again it should be noted that the frequencies selected for this example are for purposes of illustration only, and that center frequencies in the range of 350 MHz to 700 MHz are more realistic in practical SAW applications.

In operation, the multiplier 511 multiplies an incoming signal 510 by a plurality of frequencies generated from the comb generator 515. The comb generator 515 in this instance may generate a composite sine wave having frequencies at, e.g., $f_d=3$ MHz, and $f_d-(N-1)\cdot\Delta=3$ MHz$-(2-1)\cdot2$ MHz$=1$ MHz. The incoming signal 510 may be translated if necessary upon reception from a carrier frequency to a center frequency $f_c-f_d=4$ MHz$-3$ MHz$=1$ MHz. The output of multiplier 511, which combines the output of the comb generator 515 with the incoming signal 510, is a multi-frequency signal having frequency components at 2 MHz and 4 MHz—that is, $f_c$ and $f_c-\Delta$. Any codeword received on the appropriate channel will therefore be translated simultaneously to both 2 MHz and 4 MHz.

The output of multiplier 511 is provided to the multi-programmed SAW device 512. Like the multi-programmed SAW device 412 of FIG. 4, the SAW device 512 of FIG. 5 combines the characteristics of two matched filters into a single device, one filter matched to codeword C1 and the other filter matched to codeword C2. The impulse response 801 shown in FIG. 8A is the aggregate impulse response of the virtual filter 513 configured to recognize codeword C1 at a frequency of 2 MHz and the virtual filter 513 configured to recognize codeword C2 at a frequency of 4 MHz. The finger pattern, length, and spacing of the multi-programmed SAW device 512 are configured so as to provide an impulse response matching that shown in FIG. 8A.

As noted with respect to FIG. 4, FIG. 8B is a graph of the power amplitude frequency response of the filter of FIG. 8A, obtained by taking the Fourier transform of the impulse response 801 shown in FIG. 8A and conjugate squaring. One prominent response 811 corresponds to codeword C1 and is centered at 2 MHz, and another prominent response 812 corresponds to codeword C2 and is centered at 4 MHz.

FIGS. 9A and 9B are graphs of the output power spectra of the multi-programmed SAW device 512 for different inputs. FIG. 9A is a graph of the output power spectrum of the SAW device 512 when codeword C1 is input. Two power spectrum features 901 and 902 are depicted in the graph of FIG. 9A. The larger of the two features 901 is centered at 2 MHz and represents the response of the virtual filter 513 matched to codeword C1, and the smaller of the two features 902 is centered at 4 MHz and represents the response of the virtual filter 513 matched to codeword C2. FIG. 9B is a graph of the output power spectrum of the SAW device 512 when codeword C2 is input. Like FIG. 9A, two power spectrum features 911 and 912 are depicted in the graph of FIG. 9B. The larger of the two features 912 is centered at 4 MHz and represents the response of the virtual filter 513 matched to codeword C2, and the smaller of the two features 911 is centered at 2 MHz and represents the response of the virtual filter 513 matched to codeword C1.

Figure 10A:
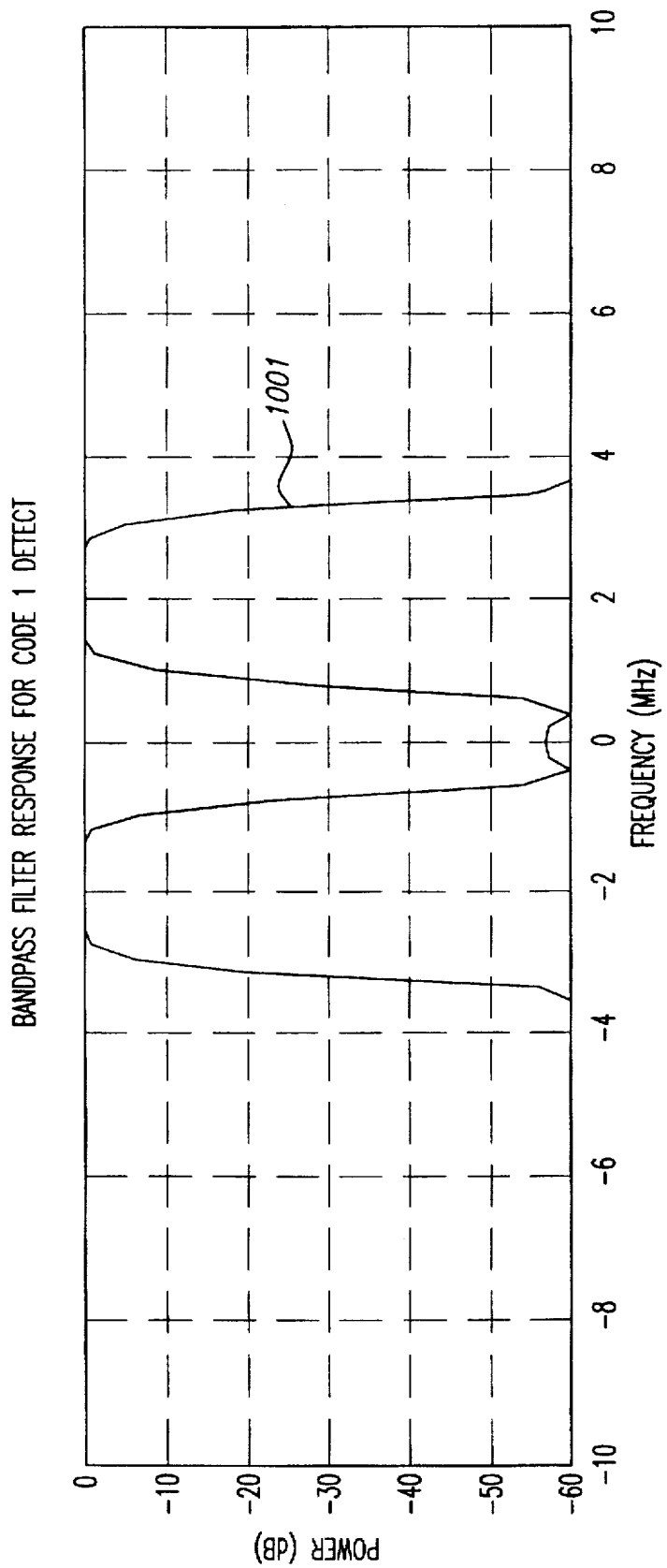
FIGS. 10A and 10B are graphs of frequency responses for a bandpass filter centered at 2 MHz and a bandpass filter centered at 4 MHz, respectively.
Figure 10B:
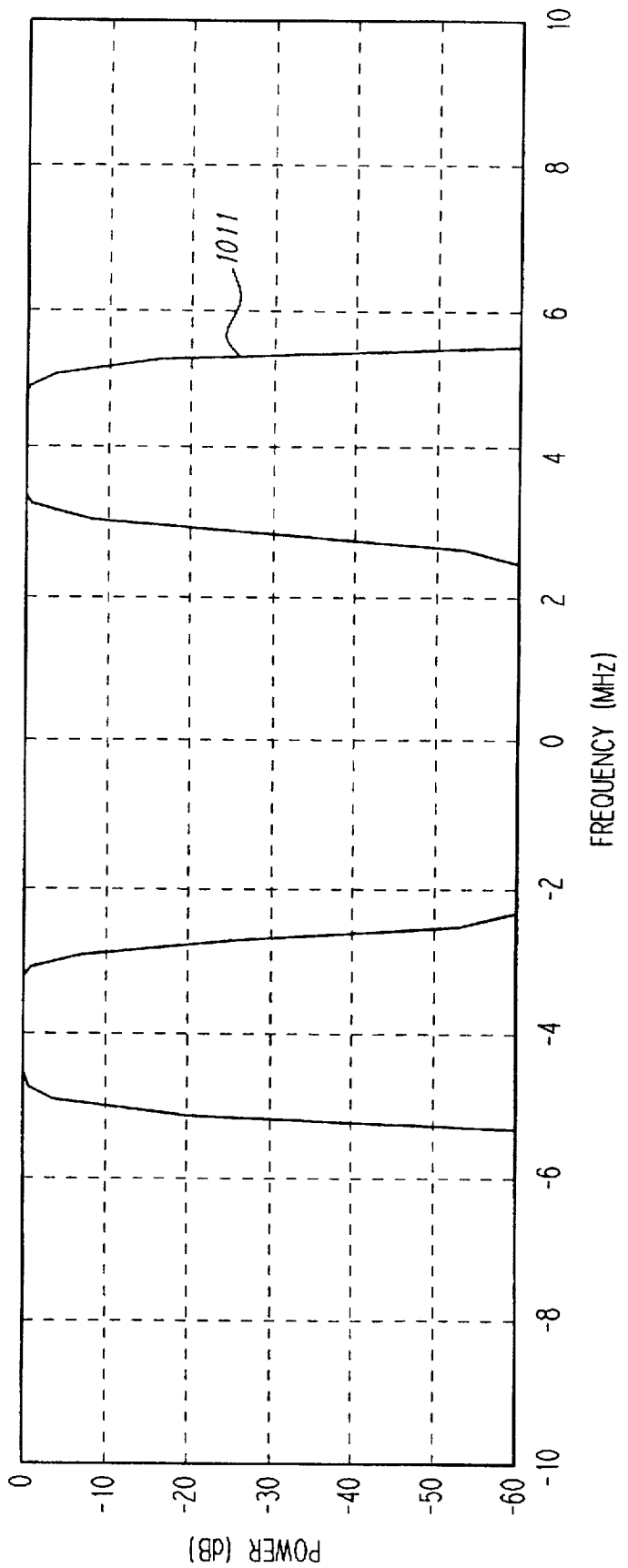

To separate the responses 901 and 902 shown in FIG. 9A or the responses 911 and 912 shown in FIG. 9B, the composite SAW correlation signal 522 output from the multi-programmed SAW device 512 is provided to a bank of bandpass filters 518. In the present example there are two bandpass filters 518, one bandpass filter 518 having a center filtering frequency of 2 MHz and another bandpass filter 518 having a center filtering frequency of 4 MHz. FIG. 10A is a graph showing an exemplary frequency response 1001 for the 2 MHz bandpass filter 518, and FIG. 10B is a graph showing an exemplary frequency response 1011 for the 4 MHz bandpass filter 518.

The outputs 519 from the bandpass filters 518 are then envelope detected, resulting in the waveforms shown in FIGS. 11A and 11B. FIG. 11A is a graph showing output waveforms from the bandpass filter 518 associated with the graph of FIG. 10A, for two different inputs. FIG. 11B is a graph showing output waveforms from the bandpass filter 518 associated with the graph of FIG. 10B, for the same two inputs.

When the first codeword C1 is sent and received, the first bandpass filter 518 exhibits an envelope detected output 1102 as shown in FIG. 11A, and the second bandpass filter 518 exhibits an envelope detected output 1112 as shown in FIG. 11B. The envelope detected output 1102 in FIG. 11A has a relatively prominent correlation peak 1104 when the first codeword C1 is correlated by the virtual filter 513 matched thereto. The envelope detected output 1112 in FIG. 11B has no similar prominent correlation peak. The envelope detected outputs 1102 and 1112 from the two bandpass filters 518 may be provided to the compare and decision circuit 532, whereupon it may be determined by a comparison of peak values that first codeword C1 was received.

Likewise, when the second codeword C2 is sent and received, the first bandpass filter 518 exhibits an envelope detected output 1103 as shown in FIG. 11A, and the second bandpass filter 518 exhibits an envelope detected output 1113 as shown in FIG. 11B. The envelope detected output 1113 in FIG. 11B has a relatively prominent correlation peak 1114 when the second codeword C2 is correlated by the virtual filter 513 matched thereto. The envelope detected output 1113 in FIG. 11A has no similar prominent correlation peak. The envelope detected outputs 1103 and 1113 from the two bandpass filters 518 may be provided to the compare and decision circuit 532, whereupon it may be determined by a comparison of peak values that the second codeword C2 was received.

The FIG. 5 device therefore permits the simultaneous recognition and correlation of M spread spectrum code sequences, while using fewer than M SAW devices, and preferably a single SAW device. The FIG. 5 device is particularly well suited for operating in a system using an M-ary technique for spread spectrum communication. In a particular M-ary system, M different codewords (i.e., symbol codes) may be used to transmit a data stream, wherein, as noted, each codeword corresponds to a particular sequence of data bits. Consider, for example, the following 4-ary encoding scheme:

| Symbol Code | Data Bits |
| --- | --- |
| Codeword-1 | 00 |
| Codeword-2 | 01 |
| Codeword-3 | 10 |
| Codeword-4 | 11 |

Using the above encoding scheme, in order to transmit a sequence of data bits "0111001000010", for example, a transmitter may select and transmit codewords in the following order: Codeword-2 (01), Codeword-4 (11), Codeword-1 (00), Codeword-3 (10), Codeword-1 (00), Codeword-2 (01), and Codeword-3 (10). The is output of the transmitter would thus be a concatenated stream of codewords. Each codeword may be the same length (e.g., L chips). The rate of transmission may be referred to as a symbol rate—that is, the number of data symbols (or, equivalently, codewords) that may be transmitted in a given period.

The concatenated stream of codewords may be transmitted as a spread spectrum signal over a particular frequency band, centered, for example, at a frequency $f_c-f_d$, and received by a receiver as shown in FIG. 5. The comb generator 515 applies a multi-frequency signal 520 to the received spread spectrum signal and generates an input signal to the multi-programmed SAW device 512, in a manner as described previously. The SAW input signal is applied simultaneously to the plurality of virtual filters 513, each of which filters at a specific frequency attuned to one of the codewords. The filter matching the particular codeword will produce a correlation pulse, centered at the same frequency, when enough chips of the codeword are received. The outputs from all of the virtual filters 513 are summed, thereby providing a composite SAW correlation signal 522 which includes the correlation pulse generated by receipt of the particular codeword.

The composite SAW correlation signal 522 is coupled to the plurality of bandpass filters 518, each of which, as noted previously, filters at a specific frequency attuned to one of the SAW virtual filters 513. The bandpass filter 518 matched to the SAW virtual filter 513 generating the correlation pulse will thus output a filtered correlation pulse 519, which is provided to an envelope detect and window circuit 530. The envelope of the filtered correlation pulse 519 is detected thereby, and if it falls within a timing window (if any) established by the envelope detect and window circuit 530, is provided to the compare and decision circuit 532.

The compare and decision circuit 532, as noted previously, compares the outputs from each of the envelope detect and window circuits 530, and ascertains which output signifies the greatest correlation. When a particular codeword is sent, the SAW virtual filter 513 attuned to the particular codeword will output a larger correlation pulse than any of the other SAW virtual filters 513, since none of the other SAW virtual filters 513 are matched to that particular codeword. By comparing the outputs from each of the envelope detect and window circuits 530, the compare and decision circuit 532 may determine which codeword was sent, and thereby recover the original data sent.

In one embodiment, the compare and decision circuit 532 comprises a lookup table having a number of addresses equal to the number of codewords used. The compare and decision circuit 532 selects the output from the envelope detect and window circuits 530 having the greatest correlation, generates an address based on the identity of that envelope detect and window circuit 530, and applies the address to the lookup table. The output of the lookup table is the unique series of data bits originally used to encode the codeword from the data stream. Thus, with the 4-ary example described above, receipt of codeword-4 would cause the sequence of data bits "11" to be output from the lookup table. As further codewords are sent and decoded, the remaining data may be recovered in a like manner.

Further details regarding M-ary communication techniques and suitable communication environments in which the present invention in its various embodiments may be deployed and utilized may be found in U.S. patent application Ser. No. 08/161,187 filed Dec. 3, 1993, in the name of inventor Robert C. Dixon, entitled "Method and Apparatus for Establishing Spread Spectrum Communication"; U.S. patent application Ser. No. 08/293,671 filed Aug. 18, 1994, in the name of inventors Robert C. Dixon, Jeffrey S. Vanderpool, and Douglas G. Smith, entitled "Multi-Mode, Multi-Band Spread Spectrum Communication System"; U.S. patent application Ser. No. 08/215,306 filed Mar. 21, 1994, in the name of inventors Gary B. Anderson, Ryan N. Jensen, Bryan K. Petch, and Peter O. Peterson, entitled "PCS Pocket Phone/Microcell Communication Over-Air Protocol"; U.S. patent application Ser. No. 08/293,671 filed Aug. 1, 1994, in the name of inventors Gary B. Anderson, Ryan N. Jensen, Bryan K. Petch, and Peter O. Peterson, entitled "PCS Pocket Phone/Microcell Communication Over-Air Protocol"; and U.S. patent application Ser. No. 08/304,091 filed Sep. 9, 1994, in the name of inventors Randy Durrant and Mark Burbach, entitled "Coherent and Noncoherent CPM Correlation Method and Apparatus," each of which applications is incorporated by reference as if fully set forth herein.

Alternative Embodiments

The present invention has been set forth in the form of its preferred embodiments. It is nevertheless intended that modifications to the disclosed correlation techniques may be made by those skilled in the art without departing from the scope and spirit of the present invention. Moreover, such modifications are considered to be within the purview of the appended claims.

For example, as an alternative to using a multi-programmed SAW device such as shown in FIGS. 4 or 5, charge couple device (CCD) filters may be used instead and configured as a filter having an aggregate impulse response such as shown in FIG. 8A.

Further, although preferred embodiments of the invention have been described with reference to particular exemplary waveforms, there is no intent to limit the scope of the invention to such waveforms. The invention may be applied to a wide variety of signal types, including binary phase-shift keyed (BPSK), quadrature phase-shift keyed (QPSK), continuous phase modulated (CPM), minimum shift keyed (MSK), superposed quadrature amplitude modulated (SQAM), Gaussian pre-filtered MSK (GMSK), and a variety of other types of signals.

What is claimed is:

1. A correlator comprising
    a frequency offset generator having as an output an offset signal with a defined offset frequency,
    a first multiplier coupled to said offset signal and to a received signal, said received signal having a defined center frequency and comprising at least one of a plurality of codes, a surface-acoustical-wave device coupled to an output of said first multiplier, and capable of correlating to any of said codes, a second multiplier coupled to an output of said surface-acoustical-wave device and to said offset signal, and a bandpass filter having a nominal center frequency at said defined center frequency, said bandpass filter coupled to an output of said second multiplier and outputting a correlation signal.

2. The correlator of claim 1 wherein said surface-acoustical-wave device comprises a plurality of filters, each of said filters matched to a different one of said codes.

3. The correlator of claim 2 wherein said surface-acoustical-wave device further comprises a summer connected to each of said filters, an output of said summer connected to said second multiplier.

4. The correlator of claim 3 wherein said summer comprises a transducer.

5. The correlator of claim 2 wherein each of said filters is attuned to a different center frequency, and each of said center frequencies are separated from the others by a multiple of a predetermined frequency constant.

6. The correlator of claim 5 wherein said offset frequency is a multiple of said predetermined frequency constant.

7. The correlator of claim 1 further comprising a third multiplier interposed between said offset signal and said second multiplier, said third multiplier having as inputs said frequency offset and a frequency translation signal, and having an output connected to said second multiplier.

8. The correlator of claim 1 wherein said codes are spread spectrum codes.

9. The correlator of claim 1 further comprising a frequency select command coupled to said frequency offset generator whereby said offset frequency is selected.

10. An apparatus for correlating a received spread spectrum signal, said received spread spectrum signal having a defined center frequency and comprising a plurality of chip sequences, said apparatus comprising:

means for providing a first frequency offset to the received spread spectrum signal, a multi-programmed surface-acoustical-wave device coupled to said first frequency offset means, said multi-programmed surface-acoustical-wave device comprising a plurality of filters and means for combining an output from each of said filters, each of said filters matched to a different chip sequence at a different center frequency, means for providing a second frequency offset to an output of said multi-programmed surface-acoustical-wave device, and a bandpass filter having a nominal center frequency of the center frequency of said received signal.

11. The apparatus of claim 10 wherein said first frequency offset and said second frequency offset are of equal magnitude.

12. The apparatus of claim 10 further comprising a frequency select command whereby said first frequency offset and said second frequency offset are selected.

13. The apparatus of claim 10 wherein the center frequency of each one of said filters differs from the center frequency of each other of said filters by a multiple of a frequency constant.

14. The apparatus of claim 13 wherein said first frequency offset and said second frequency offset are selected as a multiple of said frequency constant.

15. The apparatus of claim 14 further comprising a frequency select command whereby said first frequency offset and said second frequency offset are selected as a multiple of said frequency constant.

16. The apparatus of claim 10 wherein at least one of said first frequency offset and said second frequency offset comprises a sine wave.

17. A spread spectrum correlator for receiving and decoding a spread spectrum signal comprised of a plurality of symbol codes, each of said symbol codes selected from a group of N symbol codes, said spread spectrum correlator comprising:

a surface-acoustical-wave device including a plurality of filters and means for combining an output from each of said filters, each one of said filters matched to a different one of said N symbol codes at a different center frequency, and each of said center frequencies differing from the others by a multiple of a frequency constant, a frequency offset generator outputting a frequency offset signal in response to a frequency select command, said frequency offset signal comprising a multiple of said frequency constant, a first multiplier having as inputs said frequency offset signal and a received signal, and generating an output thereby which is connected to said surface-acoustical-wave device, a second multiplier having as inputs said frequency offset signal and an output from said surface-acoustical-wave device, and a bandpass filter coupled to an output of said second multiplier.

18. The spread spectrum correlator of claim 17 wherein said frequency offset generator comprises a voltage controlled oscillator.

19. The correlator of claim 17 further comprising a third multiplier interposed between said frequency offset signal and said second multiplier, said third multiplier having as inputs said frequency offset signal and a frequency translation signal, and having an output connected to an input of said second multiplier.

20. A method of correlation comprising the steps of:

receiving an input signal centered at a first center frequency and translating said input signal to a second center frequency, filtering said translated input signal simultaneously at a plurality of different frequencies using a surface-acoustical-wave device, whereby a correlation signal is generated at said second center frequency, translating said correlation signal to said first center frequency, and bandpass filtering said translated correlation signal at said first center frequency.

21. The method of claim 20 wherein said input signal comprises a plurality of codes, and each of said plurality of different frequencies corresponds to a distinct one of said codes.

22. The method of claim 21 wherein said codes comprise spread spectrum codes.

23. The method of claim 20 wherein said different frequencies are separated from one another by a multiple of a frequency constant, and said second center frequency corresponds to one of said different frequencies.

24. The method of claim 20 wherein the step of filtering said translated input signal simultaneously at a plurality of different frequencies results in a plurality of filter output signals, and wherein said method comprises the step of summing said filter output signals into a composite output signal.

25. A method for correlating a received spread spectrum signal, said received spread spectrum signal having a defined center frequency and comprising a plurality of chip sequences, said method comprising the steps of:

providing a first frequency offset to said received spread spectrum signal, filtering said offset signal at a plurality of different frequencies so as to generate a plurality of correlation signals, each of said correlation signals indicative of a degree of match with a different one of said chip sequences, combining said correlation signals into a composite correlation signal, providing a second frequency offset to said correlation signal, thereby translating said correlation signal to said defined center frequency, and bandpass filtering said translated correlation signal at said defined center frequency.

26. The method of claim 25 wherein said step of filtering is carried out using a multi-programmed surface-acoustical-wave device.

27. The method of claim 25 wherein said first frequency offset and said second frequency offset are the same.

28. The method of claim 25 further comprising the step of generating a frequency select command whereby said first frequency offset and said second frequency offset are selected.

29. The method of claim 25 wherein said different frequencies are separated from one another by a multiple of a frequency constant.

30. A method of decoding a received spread spectrum signal comprised of a plurality of symbol codes, each of said symbol codes selected from a group of N symbol codes, said method comprising:

translating said received spread spectrum signal from a first frequency to a second frequency, filtering said translated spread spectrum signal simultaneously at a plurality of predefined frequencies using a surface-acoustical-wave device so as to generate a plurality of correlation signals, wherein one of said predefined frequencies corresponds to said second frequency, and each of said correlation signals is indicative of a degree of match with one of said symbol codes, summing said correlation signals into a composite correlation signal, translating said composite correlation signal to said first frequency, bandpass filtering said translated composite correlation signal at said first frequency.

31. The method of claim 30 wherein each of said predefined frequencies differs from the others by a multiple of a frequency constant.

32. A correlator comprising a comb generator having as an output a multi-frequency signal comprising a plurality of comb frequencies including a top comb frequency and a bottom comb frequency, a multiplier coupled to said multi-frequency signal and a received signal, said received signal having a defined center frequency and comprising a plurality of codes, a surface-acoustical-wave device coupled to an output of said first multiplier, and capable of correlating to any of said codes, a plurality of bandpass filters coupled to said surface-acoustical-wave device, each of said bandpass filters having a nominal center frequency at one of said plurality of frequencies, and means connected to each of said bandpass filters for selecting one of said codes.

33. The correlator of claim 32 wherein said surface-acoustical-wave device comprises a plurality of filters, each of said filters matched to a different one of said codes.

34. The correlator of claim 33 wherein each of said filters generates a correlation signal, and said surface-acoustical-wave device further comprises a summer connected to each of said filters, an output of said summer coupled to each of said bandpass filters.

35. The correlator of claim 33 wherein each of said filters is attuned to a different frequency, and each of said frequencies is separated from the others by a multiple of a predetermined frequency constant.

36. The correlator of claim 35 wherein said comb frequencies are separated by a multiple of said predetermined frequency constant.

37. The correlator of claim 36 wherein said top comb frequency corresponds to the highest of the frequencies to which said filters are attuned, and said bottom comb frequency corresponds to the lowest of the frequencies to which said filters are attuned.

38. The correlator of claim 32 wherein said codes comprise spread spectrum codes.

39. The correlator of claim 32 wherein said means for selecting one of said codes comprises a plurality of envelope detection circuits, a single one of said envelope detection circuits coupled to a single one of said bandpass filters.

40. The correlator of claim 39 further comprising means for comparing an output from each of said envelope detection circuits and selecting the largest of said outputs.

41. The correlator of claim 39 further comprising means for selecting a time window during which a valid output from said bandpass filters is expected.

42. An apparatus for correlating a received spread spectrum signal, said received spread spectrum signal having a defined center frequency and comprising a plurality of chip sequences, said apparatus comprising:

a comb generator, a multiplier receiving as inputs an output of said comb generator and a received signal, a multi-programmed surface-acoustical-wave device coupled to said multiplier, a plurality of bandpass filters coupled to an output of said multi-programmed surface-acoustical-wave device, and a plurality of envelope detection circuits, one envelope detection circuit coupled to an output of each bandpass filter, and means for comparing an output from each of said envelope detection circuits and selecting one of said chip sequences thereby.

43. The apparatus of claim 42 wherein said multi-programmed surface-acoustical-wave device comprises a plurality of virtual filters and means for combining an output from each of said virtual filters, each of said virtual filters matched to a different one of said chip sequences and attuned to a different frequency.

44. The apparatus of claim 43 wherein each of said different frequencies is offset from the others by a multiple of a frequency constant.

45. The apparatus of claim 42 wherein said comb generator generates a multi-frequency signal, each frequency in said multi-frequency signal separated from the others by a multiple of a frequency constant.

46. The apparatus of claim 45 wherein at least one of said frequencies in said multi-frequency signal comprises a sine wave.

47. The apparatus of claim 42 further comprising means for establishing a time window during which said selection means accepts the outputs from said envelope detection circuits as valid.

48. A spread spectrum correlator for receiving and decoding a spread spectrum signal comprised of a plurality of symbol codes, each of said symbol codes selected from a group of M symbol codes, said spread spectrum correlator comprising:

- a surface-acoustical-wave device including a plurality of filters and means for combining an output from each of said filters, each one of said filters matched to a different one of said symbol codes at a different center frequency, and each of said center frequencies differing from the others by a multiple of a frequency constant,
- a comb filter having as an output a multi-frequency signal, said multi-frequency signal comprising a set of frequencies separated from one another by a multiple of said frequency constant,
- a multiplier receiving as inputs said multi-frequency signal and a received signal, and generating an output thereby which is connected to said surface-acoustical-wave device,
- a plurality of bandpass filters, each coupled to an output of said surface-acoustical-wave device,
- means for comparing an output from each of said bandpass filters and selecting one of said M symbol codes thereby.

49. The correlator of claim 48 wherein said comparing and selecting means comprises an envelope detection circuit for each bandpass filter.

50. The correlator of claim 48 wherein said received signal is transmitted using an M-ary technique.

51. A method of correlation comprising the steps of:

receiving a signal centered at a first center frequency and translating said received signal to a plurality of distinct frequencies, filtering said translated signal simultaneously at each of said distinct frequencies using a surface-acoustical-wave device, whereby a correlation signal is generated at one of said distinct frequencies, bandpass filtering said correlation signal at each of said distinct frequencies, thereby generating a plurality of filtered correlation signals, and comparing said filtered correlation signals to determine the contents of said received signal.

52. The method of claim 51 wherein each of said distinct frequencies is separated from one another by a frequency constant.

53. The method of claim 51 wherein said received signal comprises a plurality of codes, and each of said plurality of distinct frequencies corresponds to a distinct one of said codes.

54. The method of claim 53 wherein said codes comprise spread spectrum codes.

55. The method of claim 51 wherein the step of filtering said translated signal simultaneously at each of said distinct frequencies results in a plurality of filter output signals, and wherein said method comprises the step of summing said filter output signals into a composite output signal.

56. A method for correlating a received spread spectrum signal, said received spread spectrum signal having a defined center frequency and comprising a plurality of chip sequences, said method comprising the steps of:

providing a plurality of frequency offsets to said received spread spectrum signal to generate a multi-frequency spread spectrum signal, filtering said multi-frequency spread spectrum signal at a plurality of different frequencies, each of said different frequencies corresponding to one of said frequency offsets, so as to generate a plurality of correlation signals, each of said correlation signals indicative of a degree of match with a different one of said chip sequences, combining said correlation signals into a composite correlation signal, bandpass filtering said composite correlation signal at each of said different frequencies, thereby generating a plurality of filtered correlation signals, and comparing said filtered correlation signals and selecting one of said chip sequences thereby.

57. The method of claim 56 wherein said step of filtering is carried out using a surface-acoustical-wave device.

58. The method of claim 56 wherein each of said frequency constants is separated from the others by a multiple of a frequency constant.

59. A method of decoding a received spread spectrum signal comprised of a plurality of symbol codes, each of said symbol codes selected from a group of M symbol codes, said method comprising:

translating said received signal to a plurality of distinct frequencies, filtering said translated signal simultaneously at each of said distinct frequencies using a surface-acoustical-wave device so as to generate a plurality of correlation signals, wherein each of said correlation signals is indicative of a degree of match with one of said symbol codes, summing said correlation signals into a composite correlation signal, bandpass filtering said composite correlation signal at each of said distinct frequencies, thereby generating a plurality of filtered correlation signals, and comparing said filtered correlation signals and selecting one of said M symbol codes thereby.

60. The method of claim 59 wherein each of said predefined frequencies differs from the others by a multiple of a frequency constant.

61. The method of claim 59 wherein said step of comparing comprises a step of envelope detecting each of said filtered correlation signals.

62. A correlator comprising:

a surface-acoustical-wave device including a plurality of filters and means for combining an output from each of said filters, each one of said filters matched to a different chip sequence at a different frequency, and each of said frequencies differing from the others by a multiple of a frequency constant, means for providing an input signal to said surface-acoustical-wave device, said input signal comprising at least one of said frequencies, means for filtering an output of said surface-acoustical-wave device and generating a correlation signal indicative of one of said chip sequences.

* * * * *